US012675025B2

(12) United States Patent
Santandrea et al.

(10) Patent No.: US 12,675,025 B2
(45) Date of Patent: Jul. 7, 2026

(54) METHOD FOR GENERATING NON-CLASSICAL LIGHT FROM CLASSICAL LIGHT

(71) Applicant: QC Design GmbH, Ulm (DE)

(72) Inventors: Matteo Santandrea, Paderborn (DE);
Marcello Massaro, Paderborn (DE);
Ish Dhand, Ulm (DE)

(73) Assignee: QC Design GmbH, Munich (DE)

( * ) Notice: Subject to any disclaimer, the term of this patent is extended or adjusted under 35 U.S.C. 154(b) by 187 days.

(21) Appl. No.: 18/205,924

(22) Filed: Jun. 5, 2023

(65) Prior Publication Data

US 2024/0402570 A1    Dec. 5, 2024

(51) Int. Cl.
G02F 1/365        (2006.01)
G02F 1/355        (2006.01)

(52) U.S. Cl.
CPC ............ G02F 1/365 (2013.01); G02F 1/3551 (2013.01); *G02F 2202/20* (2013.01)

(58) Field of Classification Search
CPC ....................................................... G02F 1/365
See application file for complete search history.

(56) References Cited

U.S. PATENT DOCUMENTS

2020/0057195 A1      2/2020  Shi et al.
2024/0402570 A1*   12/2024  Santandrea ............. G02F 1/353
2025/0068001 A1*    2/2025  Chang .................... H04B 10/70
2025/0147381 A1*    5/2025  Morita .................. G02F 1/3503

OTHER PUBLICATIONS

Zatti, Luca, et al., "Spontaneous Parametric Down Conversion in Linearly Uncoupled Resonators", CLEO 2021, JM3F.6.
Hao, Lijun, et al., "Efficient TE-Polarized Mode-Order Converter Based on High-Index-Contrast Polygonal Slot in a Silicon-on-Insulator Waveguide", IEEE Photonics Journal, vol. 11, No. 2, Apr. 2019.

(Continued)

*Primary Examiner* — Rhonda S Peace
(74) *Attorney, Agent, or Firm* — Harris Beach Murtha Cullina PLLC; Laura W. Smalley

(57)        ABSTRACT
Non-classical light is generated from classical light by providing a non-classical light generation stage with at least one waveguide; inputting classical light into the non-classical light generation stage; and converting at least part of the classical light into non-classical light. The classical light is in a non-fundamental propagation mode of a waveguide of the non-classical light generation stage, and the non-classical light is in a fundamental propagation mode a waveguide of the non-classical light generation stage. The converting does not involve quasi-phase-matching. An input adaptation stage obtains classical light for input into the non-classical light generation stage. In the input adaptation stage, classical light is converted into classical light of a different waveguide propagation mode. A system has a non-classical light generation stage for converting classical light at least partly into non-classical light, and an optical switch and/or an optical phase shifter, arranged on a single optical chip.

5 Claims, 22 Drawing Sheets

(56)                    References Cited

OTHER PUBLICATIONS

Faisal A A El-Orany et al. "Generation of squeezed light in a nonlinear asymmetric directional coupler," Journal of Optics B: Quantum and Semiclassical Optics, vol. 3, Issue 2, pp. 67-75 (2001).

Mian Zhang et al. "Monolithic ultra-high-Q lithium niobate microring resonator," Optica 4, 1536-1537 (2017).

Jia-yang Chen et al. "Efficient parametric frequency conversion in lithium niobate nanophotonic chips," OSA Continuum 2, 2914-2924 (2019).

Jie Zhao et al. "High Quality Entangled Photon Pair Generation in Periodically Poled Thin-Film Lithium Niobate Waveguides," Phys Rev Lett 124, 163603 (2020).

Pawan Kumar et al. "Group index matched frequency conversion in lithium niobate on insulator waveguides," arXiv:2203.04885, Frontiers in Photonics, published Aug. 4, 2022.

Henry et al "Correlated twin-photon generation in a silicon nitride loaded thin film PPLN waveguide", arXiv:2210.00076 vol. 31, No. 5 (Feb. 27, 2023).

Cheng, Wang, et al., "Second harmonic generation in nano-structured thin-film lithium niobate waveguides," Optics. Express vol. 25, No. 6, 6963-6973 (2017).

Jia-Yang Chen et al., "Modal phase matched lithium niobate nanocircuits for integrated nonlinear photonics," OSA Continuum 1, 229-242 (2018).

Daoxin, Dai et al., in "Silicon mode (de)multiplexer enabling high capacity photonic networks-on-chip with a single-wavelength-carrier light," Opt. Lett 38, 1422-1424 (2013).

Kaushalram, Archana, et al., "Mode hybridization analysis in thin film lithium niobate strip multimode waveguides", Scientific Reports, vol. 10, 16692 (2020).

X. Han, Y. Jiang, A. Frigg, H. Xiao, P. Zhang, T. G. Nguyen, A. Boes, J. Yang, G. Ren, Y. Su, A. Mitchell, Y. Tian, Mode and Polarization-Division Multiplexing Based on Silicon Nitride Loaded Lithium Niobate on Insulator Platform. Laser & Photonics Reviews 2021, 16, 2100529. https://doi.org/10.1002/lpor.202100529.

Z Zhang, et al. in "On-chip optical mode exchange using tapered directional coupler", Sci Rep 5, 16072 (2015).

* cited by examiner

METHOD FOR GENERATING NON-CLASSICAL LIGHT FROM CLASSICAL LIGHT

FIELD OF THE INVENTION

The invention relates to methods, devices and apparatus for generating non-classical light from classical light. The invention further relates to a system comprising a non-classical light generation stage for converting classical light at least partly into non-classical light.

Background of the Invention

The use of waveguides for the generation of non-classical light is rather recent a technology. The field has gained some momentum with the introduction of lithium niobate on insulator (LNOI)-waveguides that employ the nonlinear optical material lithium niobate (LN). Mian Zhang et al disclose such waveguide in "Monolithic ultra-high-Q lithium niobate microring resonator," Optica 4, 1536-1537 (2017).

Jia-yang Chen et al in "Efficient parametric frequency conversion in lithium niobate nanophotonic chips," OSA Continuum 2, 2914-2924 (2019), demonstrate the generation of squeezed light (also referred to as squeezed vacuum) in a LNOI-based waveguide using quasi-phase matching (QPM). Similar methods are disclosed by Jie Zhao et al in "High Quality Entangled Photon Pair Generation in Periodically Poled Thin-Film Lithium Niobate Waveguides," Phys Rev Lett 124, 163603 (2020), and by Pawan Kumar et al in "Group index matched frequency conversion in lithium niobate on insulator waveguides," arXiv: 2203.04885. In QPM, momentum conservation is ensured by periodically inverting the LN crystal structure (also known as periodic poling of the material). This allows for the three fields, namely that of the pump field and those of a generated photon pair, which would naturally go out of phase due to the mismatch in their propagation speeds, to be rephrased periodically. The choice of the pitch of the periodic poling determines the wavelength of the generated photons. The above-cited disclosures employ a straight waveguide, whose crystal structure is periodically inverted along the length of the waveguide, fabricated in X-cut LNOI. The denomination "X-cut" indicates that the crystallographic axis is orthogonal to the plane of the LN substrate.

Henry et al in "Correlated twin-photon generation in a silicon nitride loaded thin film PPLN waveguide", arXiv: 2210.00076 also rely QPM, but rather than using a periodically poled waveguide, they use a conventional silicon nitride (SiN) waveguide in the form of a straight rod of SiN that is etched on top of a periodically poled LN film. This arrangement is also referred to as a hybrid waveguide.

LNOI can also be used for the manufacture of optical switches. While it is generally preferred for such optical switches to use non-doped LN material, periodically inverted LN crystal structures, as they are required in QPM, are more easily manufactured with doped LN; typically, the LN is doped with up to 5% of magnesium oxide (MgO). This can be a disadvantage if one seeks to integrate the existing devices that generate non-classical light by means of QPM with optical-switches on the same chip.

The generation of non-classical light by means of waveguides, as with the current LNOI waveguides using QPM requires tuning because of its sensitivity to fabrication imperfections. Sub-nanometric variations of the waveguide geometry—eg in the film thickness or in the waveguide width-between different sources entail the photons generated in these sources to be unable to interact with each other. This can be overcome by tuning the refractive indexes of the LN. While in general several methods of tuning are available, including the electro-optic effect, the piezo-optic effect and temperature variation, QPM excludes the former two methods, thus leaving the varying the temperature as the only remaining option. Yet, such temperature tuning can have several downsides: (1) Temperature tuning can be slow, because the thermal response of the material is slower than for example its electro optic response; (2) tuning of a source may adversely affect the optical circuitry nearby, since the heat diffusion will modify the temperature not only of the source but also of the surroundings; and (3) heat dissipation may render temperature tuning unsuitable if the source needs to be operated in cryogenic environments, as is the case of universal photonic quantum computers that have superconducting detectors placed on the same chip as the nonlinear sources. It can therefore be a disadvantage of the existing devices generating non-classical light by means of QPM that the only tuning option is temperature tuning.

Cheng Wang et al in "Second harmonic generation in nano-structured thin-film lithium niobate waveguides," Opt. Express 25, 6963-6973 (2017) and Jia-Yang Chen et al in "Modal phase matched lithium niobate nanocircuits for integrated nonlinear photonics," OSA Continuum 1, 229-242 (2018), apply modal phase matching (MPM) to classical light generation, in particular second harmonic generation (SHG). Light at a wavelength around 1 550 nm is injected into a non-poled, non-doped LNOI waveguide, in the fundamental mode. New light, at half the wavelength (around 775 nm), is generated in a non-fundamental mode, ie its spatial profile is different from the light at 1 550 nm. The main difference between the two publications is the type of LN substrate used. Wang et al use X-cut LN substrates, while Chen et al use Z-cut LN substrates.

The device presented by Wang et al is a 3 mm-long waveguide in non-doped X-cut LNOI (the length of the waveguide that contributes to the nonlinear process is 1 mm, the remaining parts are routing waveguides that do not participate in the nonlinear process since they have different cross sections). The film thickness of the substrate is 400 nm and the waveguide width equal to 580 nm is designed to achieve modal phase matching between the $TE_{00}$ and the $TE_{20}$ modes (in their paper, these are labelled $TE_1$ and $TE_3$). FIG. 1($b$) in their publication describes the conditions that allow modal phase matching in a specific waveguide geometry while FIG. 1($c$) illustrates the modes involved in the waveguide design. With such a design, the authors estimate a (length-normalised) conversion efficiency of 60%/Wcm$^2$. As a reference, QPM sources from the same group reached 2 200%/Wcm$^2$. The reduction in efficiency as compared to QPM is due to the shapes of the modes involved in the process.

Daoxin Dai et al in "Silicon mode (de) multiplexer enabling high capacity photonic networks-on-chip with a single-wavelength-carrier light," Opt Lett 38, 1422-1424 (2013), A Kaushalram et al in "Mode hybridization analysis in thin film lithium niobate strip multimode waveguides", Sci Rep 10, 16692 (2020), and X Han et al in "Mode and Polarization-Division Multiplexing Based on Silicon Nitride Loaded Lithium Niobate on Insulator Platform", Laser & Photonics Reviews 2021, 16, 2100529 disclose asymmetric directional couplers in silicon waveguides and SiN/LNOI hybrid waveguides. An asymmetric directional coupler consists of a pair of waveguides, located very close to each other and with different cross sections-usually, different widths, since it is the simplest geometrical parameter that can be tuned. The required operation is to convert light from an input mode in the input (referred to as "launch") waveguide to an output mode in the output (referred to as "exit") waveguide. To ensure mode conversion, two conditions must be met: (1) The two modes must possess the same symmetry along the plane of the structure, and (2) the velocity of the mode in the input waveguide must be equal to the velocity of mode in the output waveguide. This can be achieved by having different cross sections for the two waveguides that compose the directional coupler.

The conversion works as follows: Light is injected into the desired mode of the input waveguide; the injected light propagates until it reaches the coupling region. In the coupling region, the input and the output waveguides are placed close together, such that light can couple from the input waveguide to the output waveguide; and when the geometry of the coupling region is correctly designed, the input and the output mode (despite being different) travel at the same speed. This allows efficient light transfer between the input and the output waveguides. Therefore, light in the input mode in the input waveguide will be converted to light in the output mode in the output waveguide.

After a suitable length, which is chosen to ensure that all the input light has been converted, the two waveguides are separated, so that the conversion process stops. The conversion process can be made robust against fabrication errors as discussed in Z Zhang et al in "On-chip optical mode exchange using tapered directional coupler", Sci Rep 5, 16072 (2015). To this aim, the wider waveguide of the asymmetric directional coupler can be tapered, ie its cross section is gradually increased over the length of the directional coupler. In this way, one can compensate for small imperfections in fabricating the smaller waveguide, such as variations in the waveguide width or thickness.

Amnon Yariv et al in "Photonics: Optical Electronics in Modern Communications," Oxford Series in Electrical and Computer Engineering. Oxford University Press, Oxford (2007), disclose symmetric directional couplers are structures that consist of two closely spaced, identical waveguides. The small gap between these structures allows light to pass through from one waveguide to the other. They work by launching light into the input waveguide. As the two waveguides are brought closer together, light starts to leak into the other, output waveguide. Since the two waveguides are identical, the light will be completely transferred into the output waveguide without changing its spatial distribution (differently from what happens in the asymmetrical directional coupler mentioned above, where the spatial distribution changes when light leaks from one waveguide to the other).

Problem Addressed by the Invention

The present invention addresses the problem of providing improved methods, devices and apparatus for generating non-classical light from classical light. It further addresses the problem of providing an improved system comprising a non-classical light generation stage for converting classical light at least partly into non-classical light.

Solution According to the Invention

In the following, any reference to one (including the articles "a" and "the"), two or another number of objects is, provided nothing else is expressly mentioned, meant to be understood as not excluding the presence of further such objects in the invention. The reference numerals in the patent claims are not meant to be limiting but merely serve to improve readability of the claims.

According to one aspect of the invention, the problem is solved by the method for generating non-classical light from classical light of claim 1. The method comprises the steps of providing a non-classical light generation stage comprising at least one waveguide, inputting classical light into the non-classical light generation stage, and converting at least part of the classical light into non-classical light in the non-classical light generation stage. The classical light is in a non-fundamental propagation mode of a waveguide of the non-classical light generation stage and the non-classical light is in a fundamental propagation mode of a waveguide of the non-classical light generation stage (not necessarily the same waveguide as the one in which the classical light is in a first propagation mode).

The latter sets this aspect of the invention apart from the known QPM methods of non-classical light generation, in which methods both the classical light entering the QPM waveguide as well as the non-classical light generated in the QPM waveguide are in their fundamental propagation modes, where the fundamental mode at a given polarisation is the mode characterised by the highest effective refractive index or, equivalently, by the fastest propagation speed. This aspect of the invention is based, ia, on the inventors' finding that if the classical light is in a non-fundamental propagation mode, the manufacture of the waveguide can be simplified. In particular, the inventors have found that periodic poling can be avoided.

Following the conventional definition of classical and non-classical light, as is for example set out by David L Andrews in his introductory review of "Squeezed light" in "Photonics: Scientific Foundations, Technology and Applications", 1 (2015): 121-163. In the context of the present invention the term "non-classical light" is light in a quantum state such that the variance of the position, momentum, or any other quadrature in which the state exhibits variance below ½. Accordingly, "classical light" refers to light described by a quantum state that exhibits variance equal to or above ½ for each quadrature.

In the context of the present invention, the "non-classical light generation stage" is a device in which classical light is converted into non-classical light. Each of the one or more waveguides of the non-classical light generation stage can but does not need to be a section of a longer waveguide that extends beyond the start and/or the end of the non-classical light generation stage. The waveguide(s) of the non-classical light generation stage can also be part of a more complex photonic structure, such as an arrangement of several waveguides, which more complex photonic structure extends beyond the non-classical light generation stage.

In the context of the present invention, a "propagation mode" of light in a waveguide is the transverse field pattern, whose amplitude and polarization profiles remain constant along the longitudinal (or z coordinate) of the waveguide. Examples of modes are the fundamental mode (the mode with fastest propagation constant, at a given frequency) and the various non-fundamental transverse electric (TE), transverse magnetic (TM) and traverse electromagnetic (TEM) modes such as $TE_{11}$, $TE_{20}$, $TM_{11}$, $TEM_{10}$ and the like.

According to another aspect of the invention, the problem is solved by the method for generating non-classical light from classical light of claim 2. The method comprises the steps of providing a non-classical light generation stage comprising at least one waveguide, inputting classical light into the non-classical light generation stage, and converting at least part of the classical light into non-classical light in the non-classical light generation stage, which converting does not involve quasi-phase-matching.

In the context of the present invention, quasi-phase-matching is a method in which conversion of classical light into non-classical light is facilitated by the classical light passing through consecutive periods of a periodically poled structure of a nonlinear optical material.

In the context of the present invention, a periodically poled structure of the nonlinear optical material is a structure in which the crystal structure of the nonlinear optical material is periodically inverted in the sense that it comprises regularly spaced domains of alternating orientation of the crystalline structure of the nonlinear optical material. A period of the periodically poled structure is the combination of two adjacent domains with opposite orientation of the crystalline structure.

In the context of the present invention, the "input adaptation stage" is a device in which classical light is converted into classical light in a different waveguide propagation mode. This means that the input adaptation stage has at least one waveguide, and the classical light entering the input adaptation stage is in a first propagation mode of a waveguide of the input adaptation stage and the classical light leaving the input adaptation stage is in a second propagation mode a waveguide of the input adaptation stage, which second propagation mode is different from the first propagation mode.

Each of the one or more waveguides of the input adaptation stage can but does not need to be a section of a longer waveguide that extends beyond the start and/or the end of the input adaptation stage. The waveguide(s) of the input adaptation stage can also be part of a more complex photonic, structure, such as an arrangement of several waveguides, which more complex photonic structure extends beyond the input adaptation stage.

In the context of the present invention, an "optical switch" is a device that can attenuate or even block light passing through the optical switch in response to a signal applied to the optical switch. The signal can for example be an electrical signal. In the context of the present invention, an "optical phase shifter" is a device that can shift the phase of light passing through the optical phase shifter in response to a signal applied to the optical switch. The signal can for example be an electrical signal.

The present invention can be applied as a single mode squeezed vacuum source for Gaussian Boson Sampling. Moreover, with the inclusion of an integrated component which separates the generated squeezed vacuum light into two different waveguides depending on the light frequency, this device can be used to generate two-mode squeezed vacuum, which is an essential component of a probabilistic heralded single photon source. A similar, inverted system, composed of a cascade of the non-classical light generation stage and of the input adaptation stage, can be used as a second harmonic generation system, for example to convert light at 1 550 nm into light at 775 nm. Thereby, for example, 1 550 nm laser light can be frequency doubled.

PREFERRED EMBODIMENTS OF THE INVENTION

In a preferred embodiment of the non-classical light generation stage, the classical light is in a non-fundamental propagation mode (in the following also referred to as a "first" propagation mode) of a waveguide of the non-classical light generation stage and the non-classical light is in a fundamental propagation mode (in the following also referred to as a "second" propagation mode) of a waveguide of the non-classical light generation stage. The non-classical light preferably is squeezed light.

Preferably, the first propagation mode is a $TE_{20}$ propagation mode.

In a preferred embodiment of the non-classical light generation stage, the wavelength of at least part of the non-classical light differs from that of the classical light of which the non-classical light is generated. Preferably, the wavelength of at least part of the non-classical light is greater than that of the classical light.

A preferred non-classical light generation stage produces the non-classical light from the classical light by means of spontaneous parametric downconversion (SPDC). SPDC is a process in which a photon is split into two entangled photons (herein also referred to as "SPDC photons"). Preferably, two non-classical photons are generated from one classical photon (herein also referred to as "pump photon"). Preferably, as a result, the sum of the wavelengths of the generated SPDC photons is equal to the wavelength of the pump photon.

The preferred wavelength of the non-classical light is at least 800 nm (nanometres), more preferably at least 1 200 nm, even more preferably above at least 1 400 nm. The preferred wavelength of the non-classical light is 2 500 nm or less, more preferably at least 1 800 nm or less, even more preferably 1 600 nm or less, for example 1 550 nm.

The preferred wavelength of the classical light is at least 500 nm (nanometres), more preferably at least 600 nm, even more preferably above at least 700 nm. The preferred wavelength of the classical light is 1 000 nm or less, more preferably at least 900 nm or less, even more preferably 800 nm or less, for example 775 nm. The wavelength of the classical light preferably is the sum of the wavelength of the generated non-classical photons.

The non-classical light preferably is squeezed light. In the context of the present invention, the term "squeezed light" refers to light in a minimum uncertainty quantum state in which of a pair of quadratures X and Y, such as phase and amplitude, at least one is squeezed in the sense that it has a reduced noise $\Delta X < \frac{1}{2}$ or $\Delta Y < \frac{1}{2}$, at the expense of the other quadrature.

The preferred non-classical light is either a single-mode or a two-mode squeezed vacuum state of light. Single-mode squeezed vacuum (SMSV) is defined as $$|SMSV\rangle = S(r)|0\rangle = e^{\frac{1}{2}\left(r^{*}\hat{a}^{2}-r\hat{a}^{\dagger 2}\right)}|0\rangle =$$
$$\frac{1}{\sqrt{\cosh(r)}}\sum_{n=0}^{+\infty}\left[e^{i\phi}\tanh(r)\right]^{n}\frac{\sqrt{(2n)!}}{2^{n}n!}|2n\rangle$$

Details as to the interpretation of this equation are provided by Rodney Loudon in "The quantum theory of light", Third Edition, Oxford Science Publication, Oxford University Press, 2000, the relevant parts of which are incorporated into the present disclosure by reference. Two-mode squeezed vacuum (TMSV) is defined as $$|TMSV\rangle = S_{2}(r)|0\rangle = e^{r^{*}\hat{a}\hat{b}-r\hat{a}^{\dagger}\hat{b}^{\dagger}}|0\rangle = \frac{1}{\cosh(r)}\sum_{n=0}^{+\infty}\left[e^{i\phi}\tanh(r)\right]^{n}|n,n\rangle$$

with $\hat{a}$ and $\hat{b}$ being creation and and $\hat{a}^{\dagger}$ and $\hat{b}^{\dagger}$ being annihilation operators and r being the squeezing parameter. The above equation is provided as Equation 4.39 by Bolly L Schumaker, and Carlton M Caves in "New formalism for two-photon quantum optics. II. Mathematical foundation and compact notation". Physical Review A. 31 (5): 3093-3111, (May 1, 1985), (1985). The relevant parts of this publication as to the interpretation of this equation are incorporated into the present disclosure by reference.

These two states of light are useful in photonic quantum computation schemes. The former, single mode squeezed vacuum light, ie squeezed vacuum light generated in a single optical mode, is a useful resource for near-term photonic quantum computing schemes such as Gaussian boson sampling and continuous variable quantum neural networks. The latter, two-mode squeezed vacuum, ie squeezed vacuum light generated in two, distinguishable optical modes, can be used to generate pairs of single photons, making it relevant for the generation of deterministic single photon states that are necessary in universal quantum computing.

A preferred non-classical light generation stage employs modal phase matching (MPM) to convert classical light into non-classical light. In the context of the present invention, "modal phase matching" is defined as a method in which light of a first wavelength and a first propagation mode propagates at the same velocity as light of a second wavelength and a second propagation mode, ie, the velocities match. MPM exploits the fact that each mode's speed of propagation in the wave guide is a function of the wave's wavelength and the waveguides dimensions, and that geometries of the waveguide can be found at which the propagation speed of light in the two different modes and wavelengths match. It is an achievable advantage of this embodiment of the invention that due to the matching velocities of these two modes match, a periodical re-alignment of the phases, which in QPM is typically achieved by periodic poling, can be omitted. Accordingly, the MPM method lends itself to the use of non-doped materials, as detailed below. The MPM method also lends itself to tuning methods other than temperature tuning, such as electro-optic tuning and piezo-optic tuning. This makes the MPM method particularly suitable for operation at cryogenic temperature, as is required in many quantum computing and quantum communications devices.

A preferred non-classical light generation stage comprises a waveguide that carries both the classical light and the non-classical light; this same waveguide is in the following referred to as the "non-classical light generation waveguide". In one embodiment, the non-classical light generation waveguide is a single-pass waveguide in another embodiment it is a multi-pass waveguide, also referred to as resonators or resonating structures.

A waveguide can be shaped and sized such that it can carry light at two or more different propagation modes and wavelengths. An example of this is provided by Cheng Wang et al in their above-mentioned publication "Second harmonic generation in nano-structured thin-film lithium niobate waveguides," Opt. Express 25, 6963-6973 (2017), the relevant parts of which are herewith incorporated by reference into the present invention. In a preferred non-classical light generation waveguide, the classical light is in a first propagation mode and the non-classical light is in a second propagation mode different from the first propagation mode in the same waveguide of the non-classical light generation stage. The preferred non-classical light generation waveguide is sized and shaped such that the classical light and the non-classical light-which has a both a wavelength and a propagation mode different from those of the classical light-propagate at the same velocity, ie, their velocities match. In other words, in this preferred non-classical light generation stage the non-classical light generation waveguide's effective refractive index for the classical light input (or injected; the verbs "to input" and "to inject" are used synonymously herein) into the non-classical light generation waveguide is identical to the non-classical light generation waveguide's effective refractive index for the non-classical light.

The one or more, preferably all of the waveguides of the present invention are nanophotonic waveguides. In the context of the present invention, a waveguide is "nanophotonic" if its cross-section is 10 $\mu m^2$ or less. Nanophotonic waveguides allow high density packaging of the different optical components on chip, thus reducing the energy consumption and the footprint of the device.

A preferred waveguide of the non-classical light generation stage, preferably the non-classical light generation waveguide, is made of a nonlinear optical material. Particularly preferably the entire non-classical light generation stage is of a nonlinear optical material. The preferred nonlinear optical material is a second-order, ie $\chi^{(2)}$, nonlinear optical material, for example lithium niobate (LiNbO$_3$, also referred to as LN) and potassium titanyl phosphate (KTiOPO$_4$), or a third order, ie $\chi^{(3)}$, such as silicon (Si) and silicon nitride (SiN). It is an achievable advantage of nonlinear optical materials that they lend themselves to the use of MPM.

Preferably the nonlinear optical material of the waveguide(s) of the non-classical light generation stage, preferably the non-classical light generation waveguide, even more preferably the entire non-classical light generation stage, is placed on an insulating substrate, for example silicon dioxide (SiO$_2$). The preferred thickness of the silicon dioxide substrate is greater than 2 $\mu m$ (micrometres). In the case of the nonlinear optical material LN, this is referred to as LN-on-insulator (LNOI). The nonlinear optical material preferably is X-cut, ie, the X-axis, also referred to as a-axis, of the crystal lattice of the nonlinear optical material is perpendicular to the interface between the nonlinear optical material and the substrate. It is thereby achievable that the optical axis of the nonlinear optical material lies in the plane of the interface between the nonlinear optical material and the substrate. This means that light can be propagated through the nonlinear optical material such that TE polarized light is parallel to the optical axis of the material. In an alternative embodiment of the invention, the nonlinear optical material is Z-cut, ie, the Z-axis of the crystal lattice of the nonlinear optical material is perpendicular to the interface between the nonlinear optical material and the substrate. This means that light can be propagated through the nonlinear optical material such that TM polarized light is parallel to the optical axis of the material.

Preferably, the insulator in turn is placed onto a handle, which is, for example, of silicon (Si), LN or sapphire. A typical handle has a thickness of more than 1 $\mu m$. Moreover, a cladding layer may be provided on top of the nonlinear optical material. The preferred cladding layer is deposited on top of the waveguides, after the fabrication of the device. The deposition method is described by Cheng Wang et al in "Second harmonic generation in nano-structured thin-film lithium niobate waveguides," Opt Express 25, 6963-6973 (2017), Section 3 "Device fabrication". The preferred cladding layer has a thickness of 1 $\mu m$ or more.

Preferably, the structures of the non-classical light generation stage, in particular the waveguide(s) such as the preferably the non-classical light generation waveguide, are formed in a film of the nonlinear optical material, the film preferably being a single crystal of the nonlinear optical material, preferably by etching. The preferred thickness of the film of the nonlinear optical material is at least 150 nm, more preferably at least 200 nm, even more preferably at least 300 nm. The thickness of the film of the nonlinear optical material preferably is 1 µm or less, more preferably 800 µm or less, even more preferably 600 nm or less. Preferably, the height of the waveguide(s) of the non-classical light generation stage, preferably the non-classical light generation waveguide, is at least 65%, more preferably at least 70%, even more preferably at least 75% of the thickness of the film of the nonlinear optical material. It is an achievable advantage such waveguides that they lend themselves to the use of MPM.

The waveguide(s) of the non-classical light generation stage, such as the non-classical light generation waveguide, preferably have a thickness of at least 150 nm, more preferably at least 200 nm, more preferably at least 300 nm. The waveguide(s) of the non-classical light generation stage, such as the non-classical light generation waveguide, preferably have a thickness of 800 nm or less, more preferably 600 nm or less, more preferably 500 nm or less, for example 400 nm. It is an achievable advantage of waveguides with such dimensions that they lend themselves to the use of MPM.

The top width of the non-classical light generation waveguide preferably is greater than 100 nm, more preferably greater than 300 nm, more preferably greater than 500 nm. The top width of the non-classical light generation waveguide preferably is less than 2 000 nm, more preferably less than 1 500 nm, more preferably less than 1 000 nm.

The preferred nonlinear optical material is non-doped. In the context of the present invention, a non-doped material is a material that had no other materials or only an amount of less than 1% mol, preferably less than 0.1% mol, added to it during manufacturing for the purpose of changing its optical and/or electrical properties. It is an achievable advantage of a non-doped nonlinear material, such as non-doped LN, that it lends itself not only to being use not only in the non-classical light generation stage but also in optical switches. It is thus achievable with the present invention to integrate the non-classical light generation stage with optical switches on the same chip, preferably even in a single piece of material such as the film of nonlinear optical material.

Preferably, a waveguide, more preferably all waveguides, of the non-classical light generation stage is/are of a non-doped optical material. Even more preferably, the apparatus, even more preferably the system is of a non-doped optical material.

Preferably, the converting of at least part of the classical light into non-classical light in the non-classical light generation stage does not involve quasi-phase-matching. The preferred non-classical light generation stage does not comprise a periodically poled structure for the light to pass through periods of such periodically poled structure.

In a preferred embodiment of the present invention, an input adaptation stage for obtaining the classical light to be input into the non-classical light generation stage is provided. In the preferred input adaptation stage, classical light is converted into classical light of a different waveguide propagation mode. The preferred input adaptation stage has at least one waveguide, and the classical light entering the input adaptation stage is in a first propagation mode of a waveguide of the input adaptation stage and the classical light leaving the input adaptation stage is of a second propagation mode a waveguide of the input adaptation stage, which second propagation mode is different from the first propagation mode.

Preferably, the classical light entering the input adaptation stage is in a fundamental propagation mode of a waveguide of the input adaptation stage. Preferably, the classical light leaving the input adaptation stage is in the propagation mode of the classical light of the subsequent non-classical light generation stage, more preferably the non-classical light generation waveguide. Preferably, the classical light leaving the input adaptation stage is of a non-fundamental propagation mode a waveguide of the input adaptation stage, a non-fundamental propagation mode of the classical light in the waveguide.

It is preferred that the wavelength of the light remains unchanged in the input adaptation stage. Yet, the invention also encompasses embodiments in which the wavelength changes. The preferred wavelength of the classical light in a waveguide of the input adaptation stage as it leaves the input adaptation stage is the same as that of the light entering the subsequent non-classical light generation stage in a waveguide of the non-classical light generation stage, preferably the non-classical light generation waveguide.

In one embodiment of the invention, the input adaptation stage is combined with the non-classical light generation stage in the sense that a part of the classical light of a different waveguide propagation mode ("different" here meaning different to the waveguide propagation mode upon entry into the input adaptation stage) is converted into non-classical light in the same waveguide structure. A "waveguide structure" can be a waveguide or two or more waveguides arranged for interacting.

Preferably, for this purpose, a waveguide of the input adaptation stage doubles as a waveguide of the non-classical-light generation stage. More preferably, the output waveguide in the combined input adaptation and non-classical light generation stages has same correct cross section as a separate non-classical light generation waveguide would have. Then it is achievable that while the classical light is being converted from the input (fundamental) mode to the desired non-fundamental mode in the input adaptation stage, the converted classical light is also converted via SPDC into the non-classical light, in the same structure.

In an alternative embodiment of the invention, the input adaptation stage and the non-classical light generation stage operate sequentially in the sense that all the classical light of a different waveguide propagation mode that is obtained in the input adaptation stage jointly proceeds from the input adaptation stage to the non-classical light generation stage.

In one embodiment, the input adaptation stage is an asymmetrical directional coupler. The preferred asymmetrical directional coupler comprises a first waveguide that carries classical light entering the input adaptation stage and a second waveguide that carries classical light to be input into the subsequent non-classical light generation stage, the two waveguides preferably being evanescently coupled. Thus preferably, the propagation mode of the light in the first waveguide of the input adaptation stage is different form that in the second waveguide of the input adaptation stage. Preferably, the classical light in the first waveguide is in a fundamental propagation mode. More preferably, the classical light in the second waveguide is in the propagation mode of the classical light of the subsequent non-classical light generation stage, more preferably the non-classical light generation waveguide.

In another embodiment, the input adaptation stage is a tapered mode converter. This embodiment exploits the effect that a slow transition between two waveguide widths can allow a smooth transition between two light fields with different spatial distribution. The relevant disclosure of such waveguide by Daoxin Dai et al in "Mode conversion in tapered submicron silicon ridge optical waveguides," Opt Express 20, 13425-13439 (2012) and the previously discussed "Silicon mode (de) multiplexer enabling high capacity photonic networks-on-chip with a single-wavelength-carrier light," Opt Lett 38, 1422-1424 (2013), with the same first author are incorporated into the present disclosure by reference.

The preferred input adaptation stage is of the same nonlinear optical material as the non-classical light generation stage. The input adaptation stage preferably is integrated in the non-classical light generation stage on the same chip, particularly preferably in a single piece of material such as the film of nonlinear optical material. Preferably, a waveguide (such as the second waveguide of asymmetrical directional coupler or the tapered waveguide of the tapered mode converter) of the input adaptation stage continues as a waveguide of the non-classical light generation stage, preferably as the non-classical light generation waveguide. The waveguide preferably maintains its height as it transitions from the input adaptation stage to the non-classical light generation stage. It is preferred that all waveguides of the input adaptation stage and/or the non-classical light generation stage have the same height. A preferred waveguide maintains its cross section as it transitions from the input adaptation stage to the non-classical light generation stage.

The classical light entering the input adaptation stage or, if there is no input adaptation stage, the non-classical light generation stage, can originate either form an on-chip source or an off-chip source.

Typically, only part of the classical light entering the non-classical light generation stage is converted into non-classical light. The converted part can be small. Accordingly, in a preferred embodiment of the present invention, a separation stage for separating the non-classical light from the classical light exiting the non-classical light generation stage is provided.

In one embodiment, the separation stage comprises or is a directional coupler. The preferred directional coupler comprises a first waveguide that carries the classical and non-classical light exiting the non-classical light generation stage and a second waveguide that carries the non-classical light away for further use, the two waveguides preferably being evanescently coupled to separate the non-classical light into the second waveguide. The preferred directional coupler is a symmetrical directional coupler, ie, the two waveguides have the same cross section. The relevant disclosure of a suitable symmetrical directional coupler by Amnon Yariv et al in their previously mentioned publication "Photonics: Optical Electronics in Modern Communications," Pochi (2007), Oxford Series in Electrical and Computer Engineering. Oxford University Press, Oxford, is incorporated into the present disclosure by reference.

Alternatively or in combination with the above embodiment, a preferred separation stage comprises one or more of the following to extract the non-classical light: one or more Bragg grating filter(s) in reflection and/or transmission and one or more filtering cavity/ies. A preferred Bragg grating is formed by selective doping or variation of the cross section of a waveguide. A preferred filtering cavity is a ring resonator, an integrated Fabry Perot cavity, or a photonic crystal cavity. In one embodiment of the invention, two or more components such as directional coupler, Bragg grating filter and filtering cavity are arranged in a cascade.

The preferred separation stage is of the same nonlinear optical material as the non-classical light generation stage. The separation stage preferably is integrated with the non-classical light generation stage on the same chip, particularly preferably in a single piece of material such as the film of nonlinear optical material.

The preferred separation stage is arranged downstream of the non-classical light generation stage. Preferably, a waveguide of the non-classical light generation stage, preferably as the non-classical light generation waveguide, continues as a waveguide (such as the first waveguide) of the separation stage. The waveguide preferably maintains its height as it transitions from the non-classical light generation stage to the separation stage. It is preferred that all waveguides of the non-classical light generation stage and/or the separation stage have the same height. A preferred waveguide changes its cross section as it transitions from the non-classical light generation stage to the separation stage. Thereby, it is achievable to supress the generation of unwanted nonlinear light. Preferably, the cross sections gradually transition from one to the other by means of an adiabatic taper.

A preferred embodiment of the present invention comprises one or more optical switches and/or optical phase shifters. A preferred optical switch routes the input light into either one of two paths in response to a signal. The preferred signal is an electric signal. The relevant parts of the disclosure of a suitable optical switch by Wang et al in the section "Nanophotonic lithium niobate electro-optic modulators," Optics Express Opt. Express 26, 1547-1555 (2018) is incorporated into the present disclosure by reference. A preferred optical phase shifter shifts the phase of the light in response to a signal. The preferred signal is an electric signal. The relevant parts of the disclosure of a phase shifter and its fabrication by Zihan Li et al in the section "Fabrication process with DLC hard mask" on pages 3 and 4 of their publication "Tightly confining lithium niobate photonic integrated circuits and lasers," arXiv: 2208.05556 (2022), are incorporated into the present disclosure by reference.

The preferred optical switch or optical phase shifter is of the same nonlinear optical material as the non-classical light generation stage. The optical switch or optical phase shifter preferably is integrated with the non-classical light generation stage on the same chip, particularly preferably in a single piece of material such as the film of nonlinear optical material.

The preferred optical switch or optical phase shifter is arranged downstream of the non-classical light generation stage, particularly preferably downstream the separation stage. Preferably, a waveguide of the non-classical light generation stage or the separation stage continues as a waveguide of the optical switch or optical phase shifter. The waveguide preferably maintains its height as it transitions to the separation stage. It is preferred that all waveguides of the non-classical light generation stage and/or the optical switch or optical phase shifter have the same height. A preferred waveguide changes its cross section as it transitions to the optical switch or optical phase shifter. Thereby, it is achievable to supress the generation of unwanted nonlinear light. Preferably, the cross sections gradually transition from one to the other by means of an adiabatic taper.

A preferred apparatus according to the invention is an apparatus that performs Gaussian Boson Sampling (GBS). In the context of the present invention, GBS consists of preparing of a number of single-mode squeezed vacuum states, interfere them and measuring them in the Fock basis.

Preferably, a method according to the invention is executed or a device, apparatus or system according to the invention is operated at cryogenic temperatures. Thereby it can be exploited that some embodiments of the present invention lend themselves to cryogenic temperature, because they do not require temperature tuning but can rely on other types of tuning such as electro-optic tuning and piezo-optic tuning.

In one embodiment, a method, device, apparatus or system according to the invention is employed in a photonic quantum computer, preferably for generating quantum light used in a photonic quantum computing schemes such as Gaussian Boson Sampling and continuous variable quantum neural networks.

In one embodiment, a method device, apparatus or system according to the invention is employed in a quantum communication, preferably as a source of heralded single photons in a quantum communication apparatus. In such applications, the non-classical light can be used directly. For example, a chip comprises four waveguides for the generation of single mode squeezed vacuum, which are then routed to a near-term photonic quantum computing section to perform eg Gaussian Boson Sampling.

In another example, a chip comprises four waveguides generating two-mode squeezed vacuum. Splitting one of the two mode and detecting the presence of a photon allows the heralding of its partner. One can thus route the heralded single photon to the universal quantum computing section of the chip. In universal photonic quantum computing schemes based on linear optics, the light is then routed to the universal photonic quantum computing section. This universal photonic quantum computing section can be either on the same chip or on a different chip (in this second case, connection between the two chips is established via an optical fibre).

Preferred features of the invention which may be applied alone or in combination are discussed in the following and in the dependent claims.

BRIEF DESCRIPTION OF THE DRAWINGS

In the following, further preferred embodiments of invention are illustrated by means of examples. The invention is not limited to these examples, however.

The drawings schematically show:

FIG. 21A A view of the non-classical light generation stage with multiple interconnected straight waveguides;

DETAILED DESCRIPTION OF AN EMBODIMENT OF THE INVENTION

Figure 1:
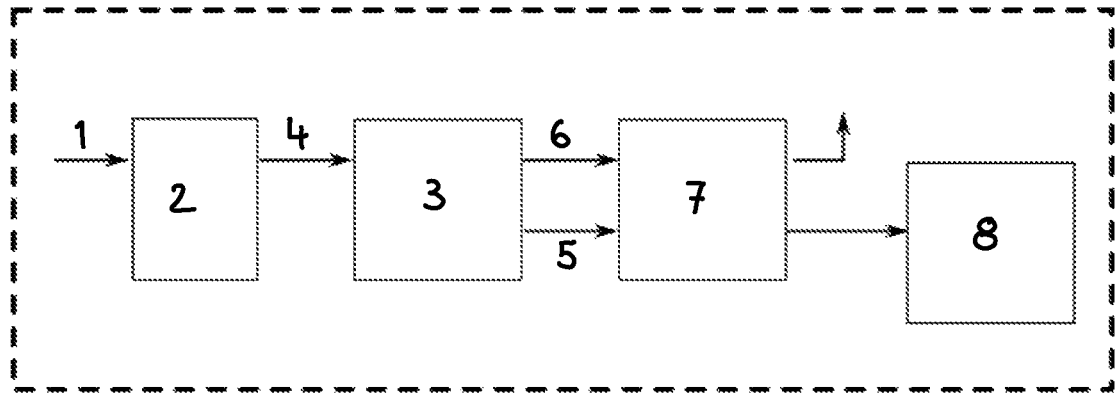
FIG. 1A scheme for the generation of squeezed light in the inventors' non-doped, MPM-based LNOI nanophotonic waveguides.

In the following description of preferred embodiments of the invention, identical reference numerals refer to identical or similar components.

Stages of Non-Classical Light Generation

A method for generating squeezed vacuum in a nanophotonic $\chi^{(2)}$ waveguide is shown in FIG. 1. All stages of this method are present on the same optical chip of non-doped LNOI:

1. Input light 1, coming from either an off- or on-chip source, is injected into an input adaptation stage 2. This adaptation stage 2 has the function of modifying the properties of the input light 1 to match it to the type of input required for the proper functioning of the second stage, the non-classical light generation stage 3.

2. In the non-classical light generation stage 3, the adapted input light 4 undergoes spontaneous parametric downconversion and generates squeezed light 5. In this stage 3, photons belonging to the input light field 4 are converted into light at longer wavelengths using modal phase matching. To this aim, a waveguide of the non-classical light generation stage 3 is dimensioned so to achieve modal phase matching between the input light 4 and the generated field 5.

3. The residual input light 6 and the generated light 5 then enter the final stage, the separation stage 7, also referred to as pump filtering stage. In this stage, the residual input light 6 is physically separated from the generated light 5. The generated light can then be used for photonic quantum computing 8.

The three different sections 2, 3 and 7 can be designed to have different waveguide cross sections—eg to avoid unwanted nonlinear light generation in the first and third stage. In this case, to connect these sections, intermediate transition regions can be present in between the main three stages, where the waveguide dimensions are adapted by means of adiabatic tapers.

Figure 2:
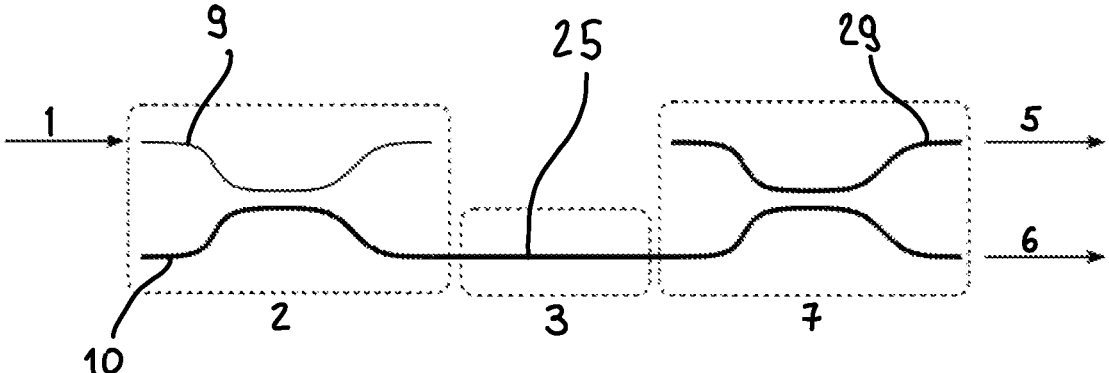
FIG. 2A scheme of the three stages of our MPM single mode squeezed vacuum source in LNOI.

Example 1: System for Generating Single Mode Squeezed Vacuum in a Non-Doped Single Pass LNOI Nanophotonic Waveguide General Considerations We designed a system in non-doped, non-poled LNOI that can generate squeezed vacuum at a wavelength of 1 550 nm using the aforementioned method for generating squeezed vacuum in a $\chi^{(2)}$ nanophotonic waveguide without the need of periodic poling. The current example is designed for X-cut non-doped LNOI substrates. It is possible to apply the current invention to other types of LNOI substrates-such as Z-cut LNOI or doped LNOI—as well as other types of $\chi^{(2)}$ substrates. However, the specific design will need to be adapted, depending on the refractive index of the chosen substrate. The schematic of the system is shown in the following FIG. 2. The device works as follows:

1. Classical input light (also referred to as the pump field) 1 at 775 nm is injected into an input port of the system into the fundamental $TE_{00}$ mode. The pump field 1 may come from a different section of the optical chip or may be injected on the chip using suitable edge or grating couplers. The specific design of these couplers is not essential to this invention.

2. The pump field 1 then enters the input adaptation stage 2. The function of this stage is to convert classical pump light from the input mode to the mode required by the non-classical light generation stage 3. In our design, the input adaptation stage 2 consists of an asymmetric directional coupler. The pump light enters the coupler in one 9 of the two input arms, and it is evanescently coupled into the opposite output arm 10. The input adaptation stage 2 is not restricted to be an asymmetric directional coupler, but it can also be an adiabatic taper 11.

3. The pump light, now converted into the correct non-fundamental spatial mode, then enters the non-classical light generation stage 3. The function of this stage is to generate the squeezed light, using SPDC of the input pump light. The cross section of the waveguide in this stage is designed such that the 775 nm field in the non-fundamental mode is phase matched with the 1 550 nm field in the fundamental mode, as discussed below. This allows the generation of single-mode squeezed vacuum at 1 550 nm.

4. The residual input light and the generated single-mode squeezed light finally enter the separation stage 7. The function of this stage is to spatially separate the strong pump light 6 and the much weaker non-classical light 5, in order transmit only the non-classical light 5 to the subsequent systems. In our design, this stage consists in a symmetrical directional coupler, where both fields (at 775 nm and at 1 550 nm) enter one of the two input ports of the directional coupler, and the generated single-mode squeezed vacuum is coupled into the opposite output port via evanescent coupling.

Figure 3:
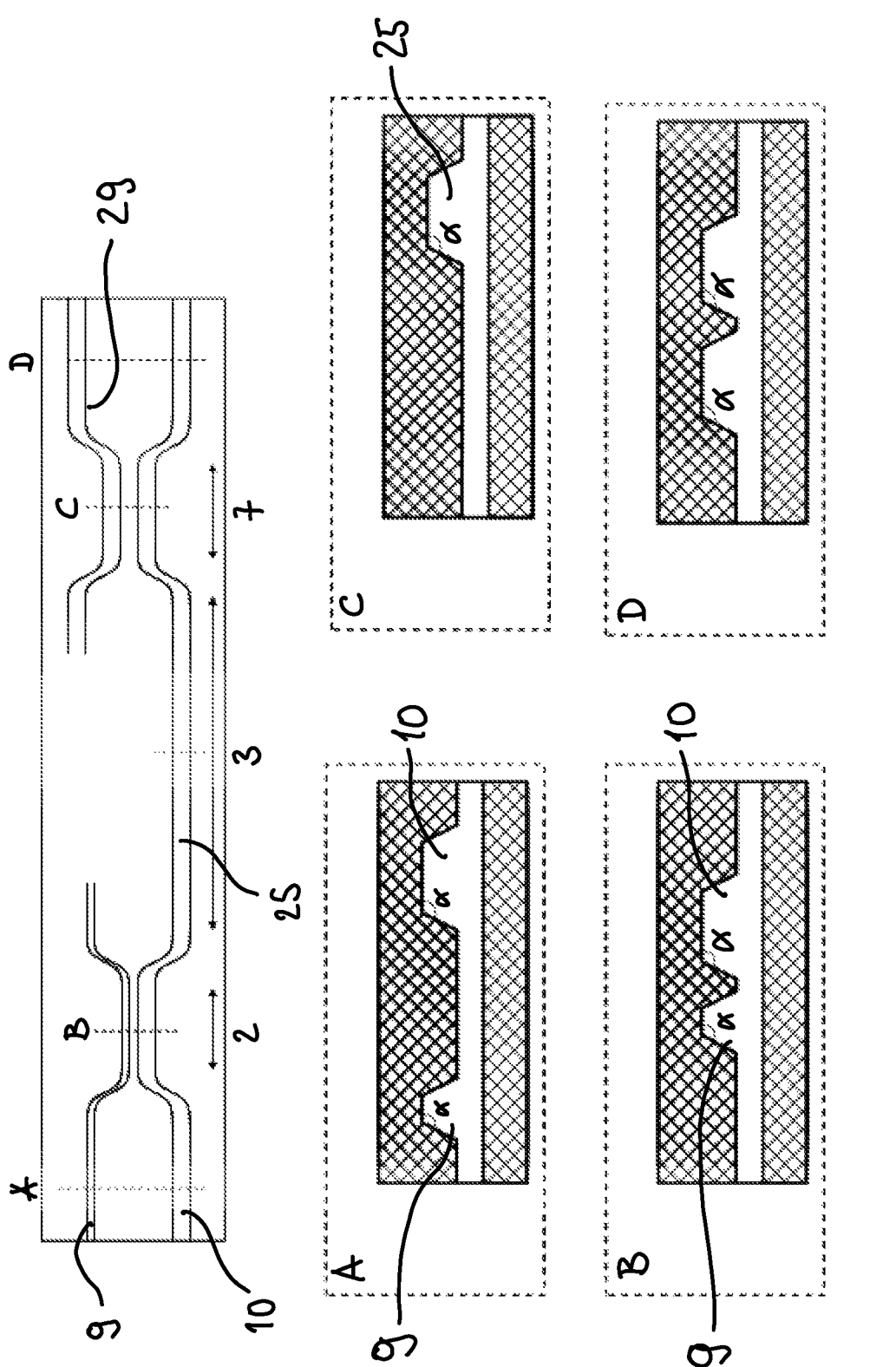
FIG. 3A top view and cross section of the proposed device in Example 1 below. The layer stack, ie the thickness of the different materials, is shown in FIG. 4.

The detailed top view and cross section of the device is shown in FIG. 3.

The design of the individual sections can vary, depending on the fabrication equipment and on the substrate used. In the following, we will provide a set of fabrication parameters for each component, given the usage of a specific substrate, namely non-doped X-cut LNOI. The device has been designed in agreement with the fabrication method detailed by Zihan Li et al in the section "Fabrication process with DLC hard mask", pages 3 to 4 of "Tightly confining lithium niobate photonic integrated circuits and lasers," arXiv: 2208.05556 (2022). This disclosure of the fabrication process in this document is incorporated into the present disclosure by reference.

Common properties of the geometry of the system discussed in this Example 1

Figure 4:
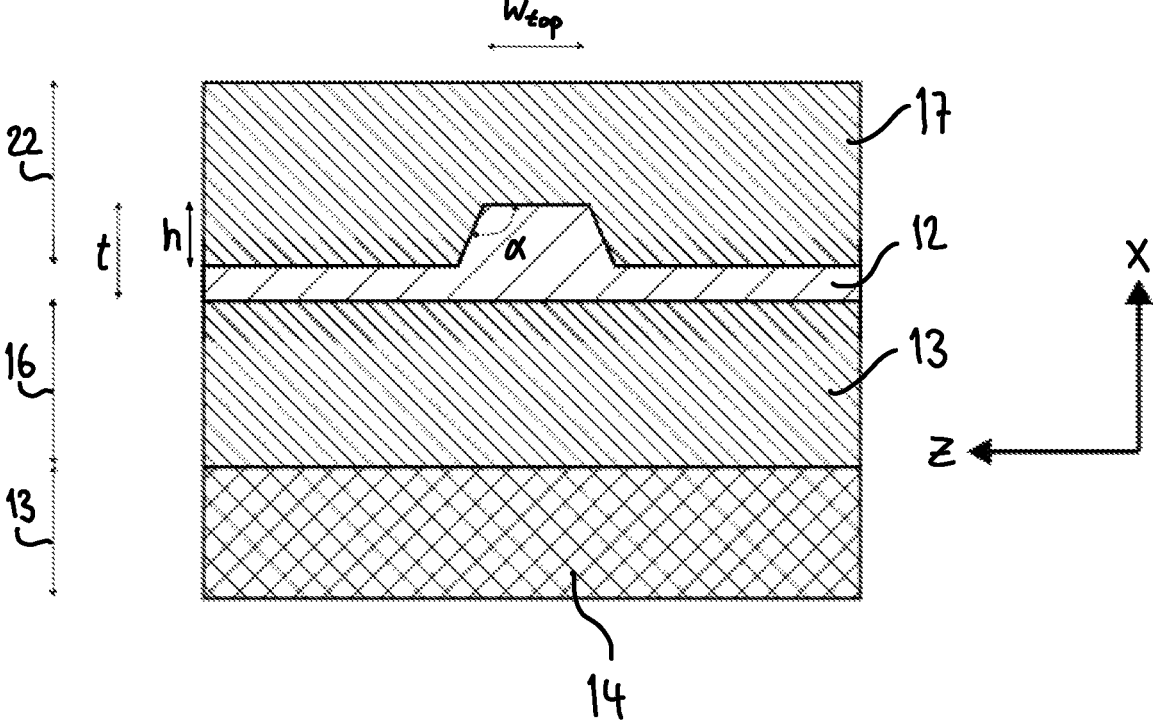
FIG. 4A cross sectional view of a straight waveguide, highlighting the different degrees of freedom of the LNOI platform.

The layer stack, ie the thickness and order of the layers that compose the material platform before etching, can be seen in FIG. 4. The system comprising A lithium niobate (LN) thin film 12

A substrate layer 13 a handle 14 is provided as-is by the LNOI supplier. For the scope of the current invention, the handle 14 can be made of lithium niobate, silicon or sapphire, and its thickness 15 is irrelevant; yet, for reasons of convenient handling it, the thickness 15 is typically greater than 1 μm. The substrate layer 13 is made of silicon dioxide ($SiO_2$) and its thickness 16 is greater than 2 μm.

The LN thin film 12 is non-doped X-cut LN. The propagation direction is the crystallographic Y-axis, ie the waveguides need to be parallel to the crystallographic Y-axis. The simulations, discussed below, revealed that thicknesses t between 300 nm and 500 nm yield suitable MPM conditions. Therefore, in the design of Example 1 considers a film thickness t=400±100 nm. From here onwards, all physical dimensions relative to Example 1 are calculated assuming a film thickness of 400 nm. For a different film thickness, the specified quantities will need to be slightly changed, to account for the different film thickness. The method for calculating the new quantities is specified below. The etching depth h of the LN film needs to be at least 75% of the film thickness, according to the simulation method discussed below. The sidewall angle α indicated in FIG. 4 is set to be 103°, due to the fabrication parameters discussed by Zihan Li et al in the section regarding the fabrication process on pages 3 to 4 of the above-mentioned publication. The waveguide top width $w_{top}$ is a free parameter and will be different in each section of the device.

The cladding layer 17 is deposited on top of the waveguides, after the fabrication of the device. The deposition method is described Cheng Wang et al in the section 3, "3 Device fabrication", of the above-mentioned publication "Second harmonic generation in nano-structured thin-film lithium niobate waveguides," Opt. Express 25, 6963-6973 (2017). Any thickness 22 that is greater than 1 μm is sufficient.

In this example design, we considered generation of squeezed light at 1 550 nm. The design methods and fabrication can be adapted to address other wavelengths. However, for different target wavelengths, the fabrication parameters will vary.

For the non-doped X-cut LNOI substrate discussed in this Example 1, simulations show that the critical parameters are the film thickness t and the etching depth. For a film thickness t between 300 and 500 nm, it is always possible to achieve MPM by varying the waveguide width and/or the sidewall angle. Regarding the etching depth, our simulations show that a film etched by at least 75% entails geometries that led themselves to MPM. The sidewall angle $\alpha$ is defined by the etching process, and varying the sidewall angle $\alpha$ requires adapting the waveguide width to ensure MPM. However, we found no practical restrictions for the admissible sidewall angles $\alpha$. Similarly, we found that the presence of a cladding layer 17 on top of the LN film is not required to obtain MPM. However, it is commonly present, to protect the waveguides and the electrodes.

Design of the Input Adaptation Stage

Introductory Notes

We start describing the design of the input adaptation stage 2. In the design process, one must first design the non-classical light generation stage 3, which is the more critical one. The design of the non-classical light generation stage 3 provides the design constraints for the input adaptation stage 2, namely the waveguide width $w_{top}$ and the necessary non-fundamental mode 18—in this case the $TE_{20}$ mode. For this reason, in this section we assume known the results of the design of the non-classical light generation stage 3, namely the target waveguide top width $w_{top}=810$ nm and the shape of the non-fundamental mode 18 shown in FIG. 7. Operatively, one needs to start with the design of the non-classical light generation stage 3 and then carry on with the design of the input adaptation stage 2 and the separation stage 7, which are independent.

Design Principles and Properties

The input adaptation stage 2 is an integrated component used to efficiently convert single mode 775 nm pump light 1 from the fundamental $TE_{00}$ mode of the input waveguide into the $TE_{20}$ mode in a different output waveguide. It means that, ideally, 100% of the light in the $TE_{00}$ mode is converted into the $TE_{20}$ mode.

Figure 5:
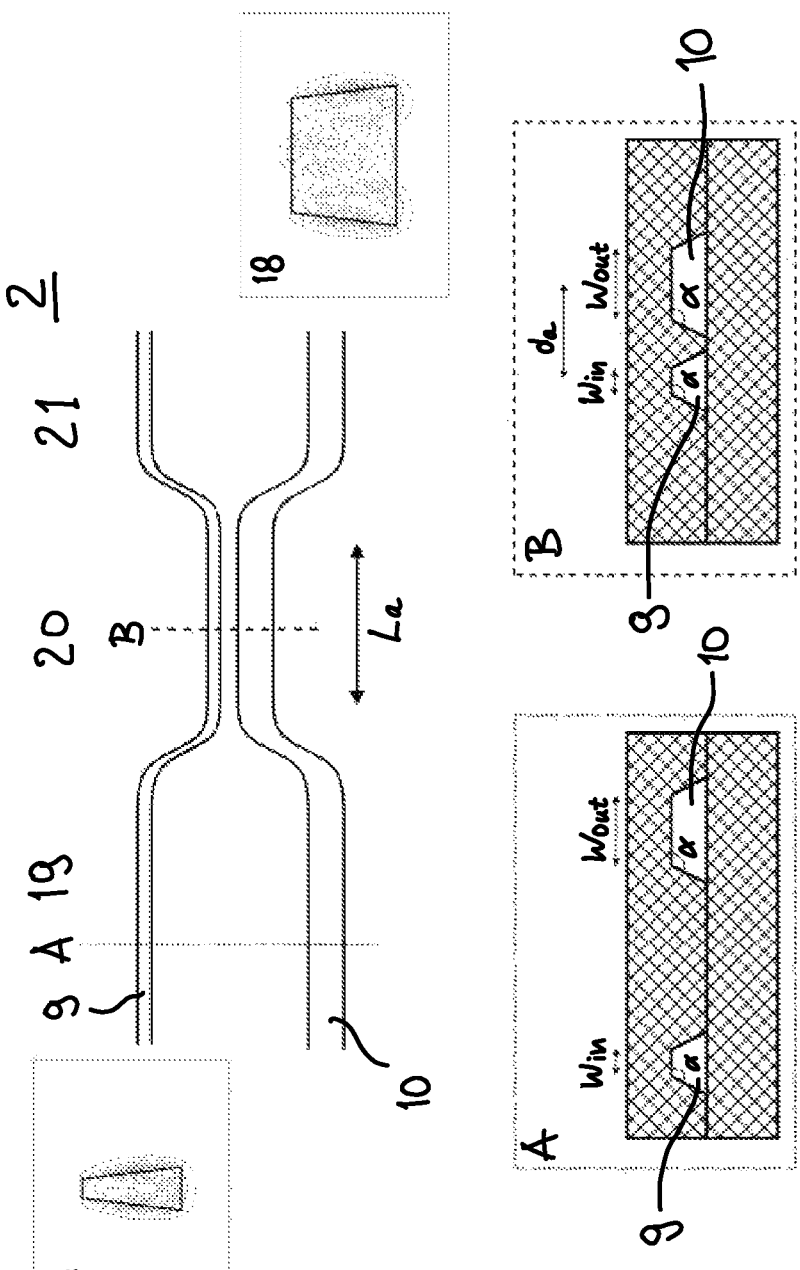
FIG. 5A detailed design drawing of the pump mode conversion stage.

The input adaptation stage 2 consists of an asymmetrical directional coupler. The device has two inputs, two outputs and three sections: the input section 19, the coupling section 20 and the output section 21. The scheme of the device is shown in FIG. 5. In the input section, two waveguides 9, 10, characterised by different widths, are slowly brought close together using bent waveguides. Bends with a wide variety of designs can be used here, ie they can be Euler bends, cosine bends, splines. Their functionality is limited to bringing the waveguides 9, 10 close together without losing light from bending too abruptly. If necessary, the waveguide widths can be varied throughout the bends, to obtain the designed waveguide widths in the coupling section 20. In the coupling section 20, the waveguides 9, 10 have well-defined width, gap and length, in order to achieve modal conversion from one waveguide to the other. These quantities are specified hereafter and are dependent on the layer stack chosen and described above.

Figure 6:
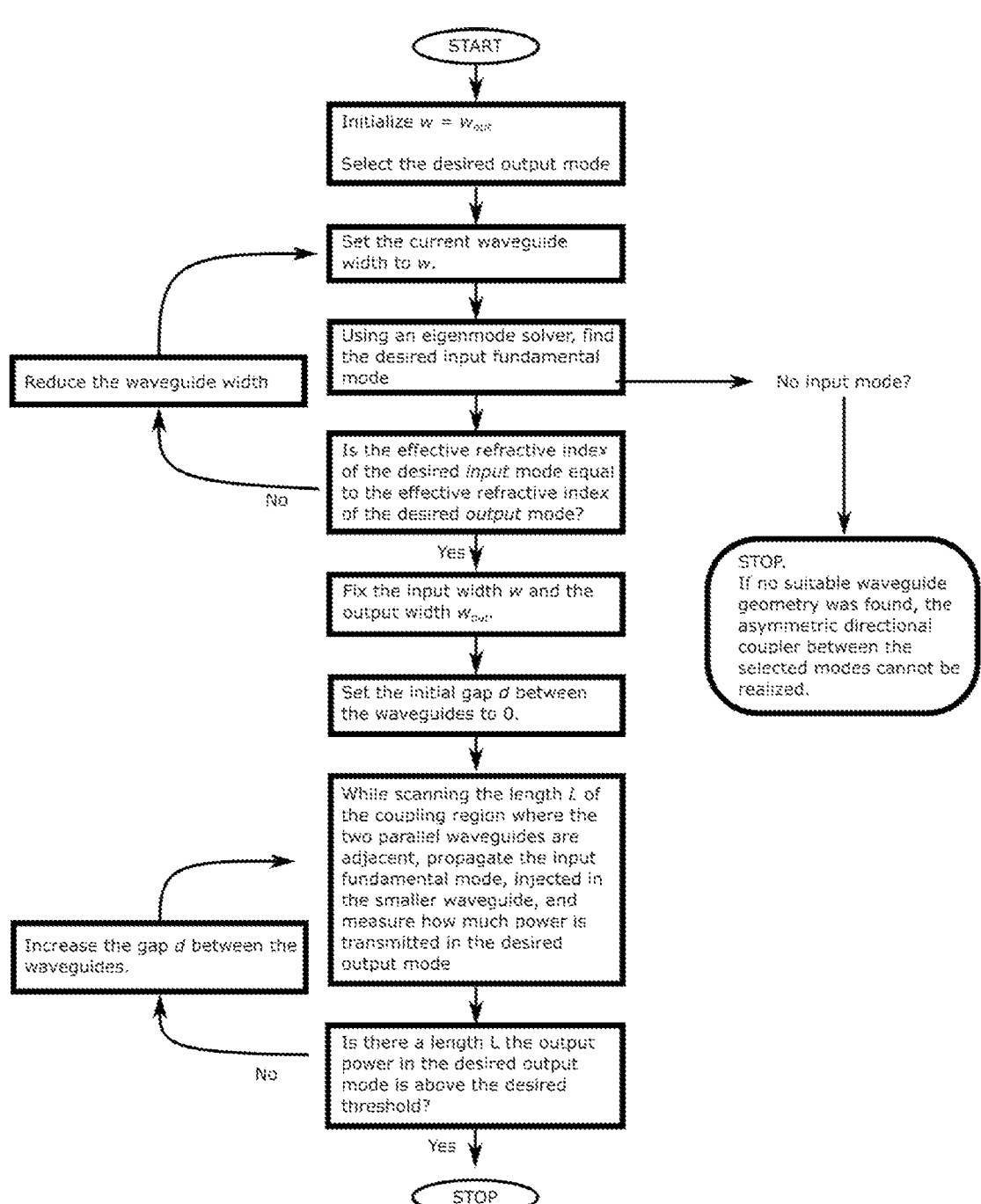
FIG. 6A flowchart describing the method to design the asymmetric directional coupler.

The design of the asymmetric directional coupler proceeds as detailed in the following ALGORITHM 1, a procedure described in FIG. 6:

1. From the design of non-classical light generation stage 3, the target output waveguide top width $w_{out}$, the non-fundamental $TE_{20}$ mode of the pump light at 775 nm and the effective refractive index of the mode $$n_{pump,out}^{TE20}$$

are known.

2. Using a suitable eigenmode solver, one calculates the properties (mode shape and effective refractive index) of the fundamental $TE_{00}$ mode of the waveguide at 775 nm for different waveguide widths. The aim of these calculations is to find the correct width $w_{in}$ of the input waveguide. The correct condition for the input waveguide 9 width is the one that ensures that the fundamental $TE_{00}$ mode of the 775 nm pump light in the input waveguide ($w_{in}$) has the same effective refractive index as the non-fundamental $TE_{20}$ mode of the 775 nm pump light in the output waveguide ($w_{out}$), ie $$n_{pump,in}^{TE00} = n_{pump,out}^{TE20}.$$

3. With input and the output waveguide widths $w_{in}$ and $w_{out}$ fixed, one uses a suitable electromagnetic field propagation solver, such as an eigenmode expansion (EME) solver, a beam propagation (BPM) solver or a finite difference time domain (FDTD) solver to study the optimal length of the coupling region and the optimal distance between the two parallel waveguides 9, 10 in the coupling region. One launches the input $TE_{00}$ mode in the narrower input waveguide 9 and simulates how much light is coupled to the output wider waveguide 9 in the target mode, while varying the distance between the two parallel waveguides and the length of the coupling region. In this way, one studies what is the correct length of the coupler and the correct distance between the two waveguides 9, 10 which maximises the power transfer from the input 9 to the output waveguide 10.

Design Specifications

Figure 7:
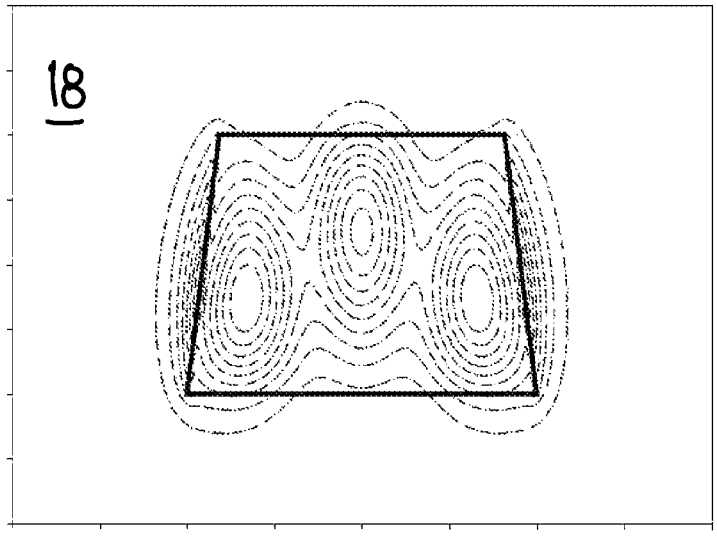
FIG. 7 An outline of the $TE_{20}$ pump mode in the waveguide with 810 nm top width; this is the input pump mode required in the non-classical light generation stage.

For the layer stack discussed above, the design of the non-classical light generation stage 3 requires a waveguide top with $w_{top}=810$ nm, corresponding to the target $TE_{20}$ mode 18 shown in FIG. 7.

Figure 9:
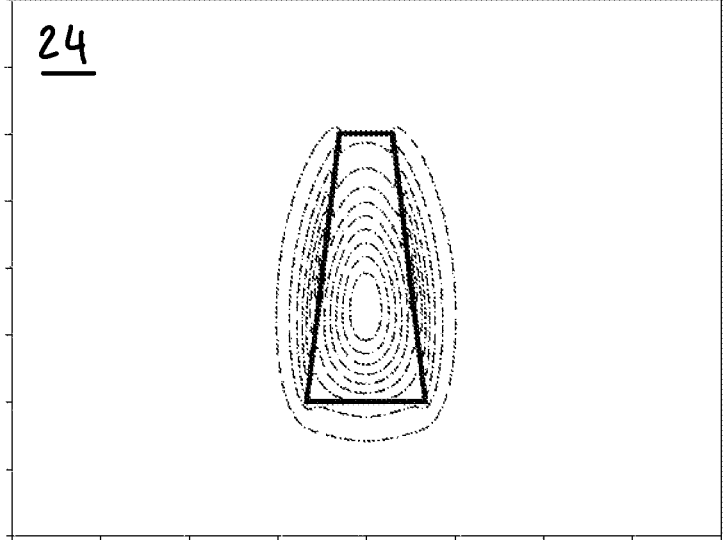
FIG. 9 An outline of the $TE_{00}$ input pump mode in the 145 nm-wide waveguide.
Figure 8:
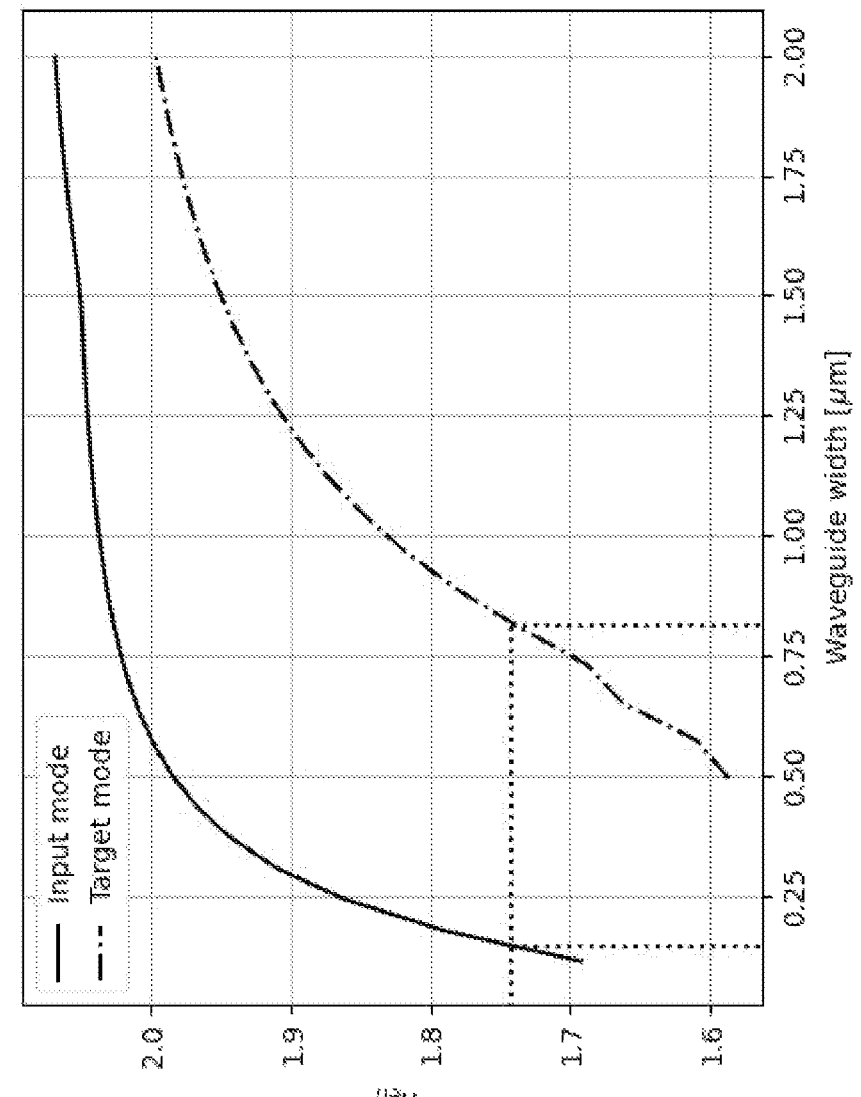
FIG. 8A graph indicating the dependence of the effective refractive index $n_{eff}$ of the input $TE_{00}$ mode and the output $TE_{20}$ mode, for different waveguide widths.

We carried out the simulation detailed in step 2 of ALGORITHM 1 using the FDE solver contained in ModeSolution in Ansys Lumerical, and obtained the plot in FIG. 8, which shows that, for an input waveguide width of $w_{in}=145$ nm, the input $TE_{00}$ mode 24, shown in FIG. 9, and the output $TE_{20}$ mode 18, shown in FIG. 7, have the same effective refractive index.

Figure 10:
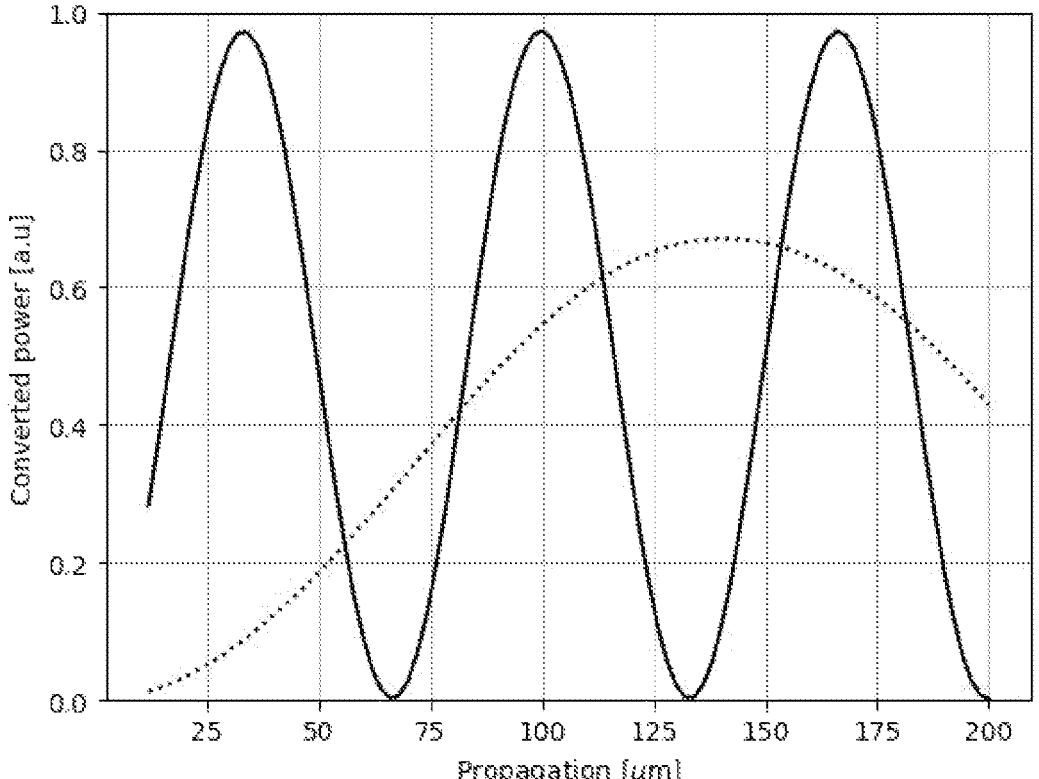
FIG. 10A graph indicating the optimal power transfer from the $TE_{00}$ mode to the $TE_{20}$ mode. Optimal coupling is observed for an inter-waveguide distance d=900 nm and a coupling length of 34 μm.

After determining the properties of the input mode, we proceeded with the step 3 of ALGORITHM 1 to determine the optimal inter-waveguide distance $d_a$ and coupling length $L_a$. To this aim, we employed the eigenmode expansion (EME) solver in ModeSolution of the Ansys Lumerical. We injected the $TE_{00}$ mode in the narrower waveguide and varied the parameters $d_a$ and $L_a$ to maximise the power transferred to the $TE_{20}$ mode. The results of this procedure are shown in FIG. 10. It indicates the converted power as a function of propagation, ie, coupling length at a coupler gap of 0.9 μm (full line) and 1.1 μm (dotted line).

Figure 11:
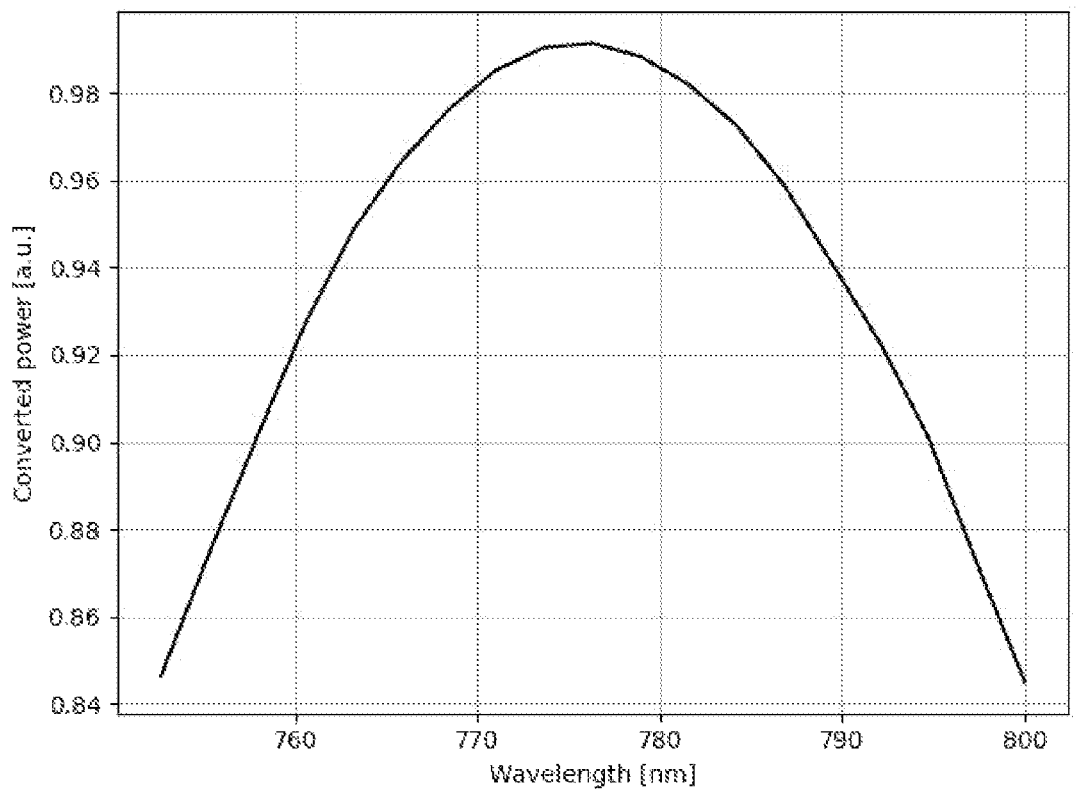
FIG. 11A graph indication the dependence of the optimal power transfer between the $TE_{00}$ and $TE_{20}$ as the wavelength of the pump field is varied.

Using the EME solver in Ansys Lumerical, it is possible to estimate the wavelength acceptance bandwidth of this device. The simulations show that >90% mode conversion is possible in the range between 758 nm and 795 nm, as shown in FIG. 11.

Design of Non-Classical Light Generation Stage

Design Principles and Properties

Figure 12:
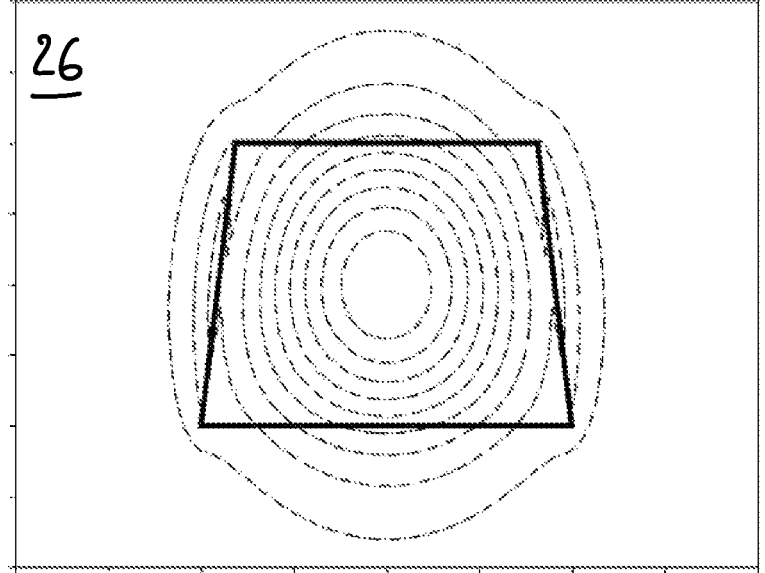
FIG. 12 An outline of the $TE_{00}$ mode at 1 550 nm in the waveguide with 810 nm top width.
Figure 13:
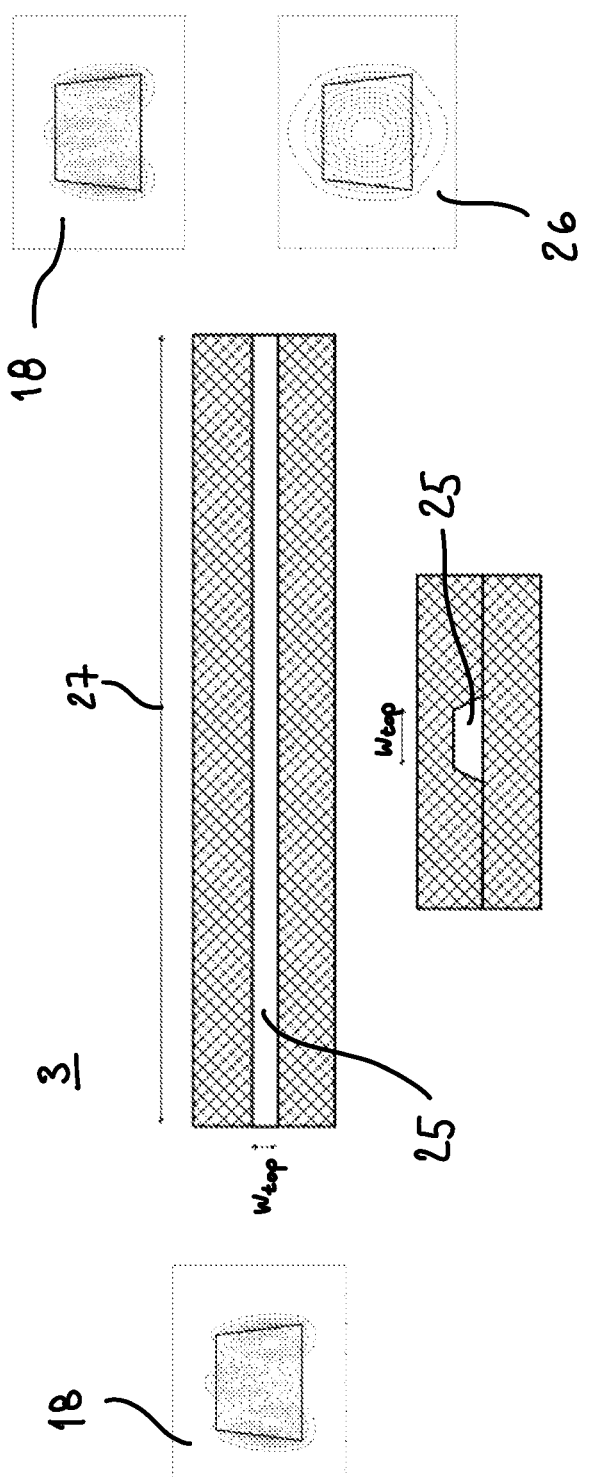
FIG. 13A top view and cross section of the straight waveguide providing MPM for the generation of single mode squeezed vacuum.

The non-classical light generation stage 3 is an integrated component able to split one pump photon at 775 nm into one photon pair at 1 550 nm. This process is called spontaneous parametric downconversion (SPDC). In the present example, the component is a straight waveguide 25 that uses a type 0 process, where one pump photon at 775 nm in the $TE_{20}$ mode 18 (FIG. 7) is converted into two photons at 1 550 nm in the $TE_{00}$ mode 26 (FIG. 12) by means of three-wave mixing. The top view and cross section of this component are shown in FIG. 13.

Figure 14:
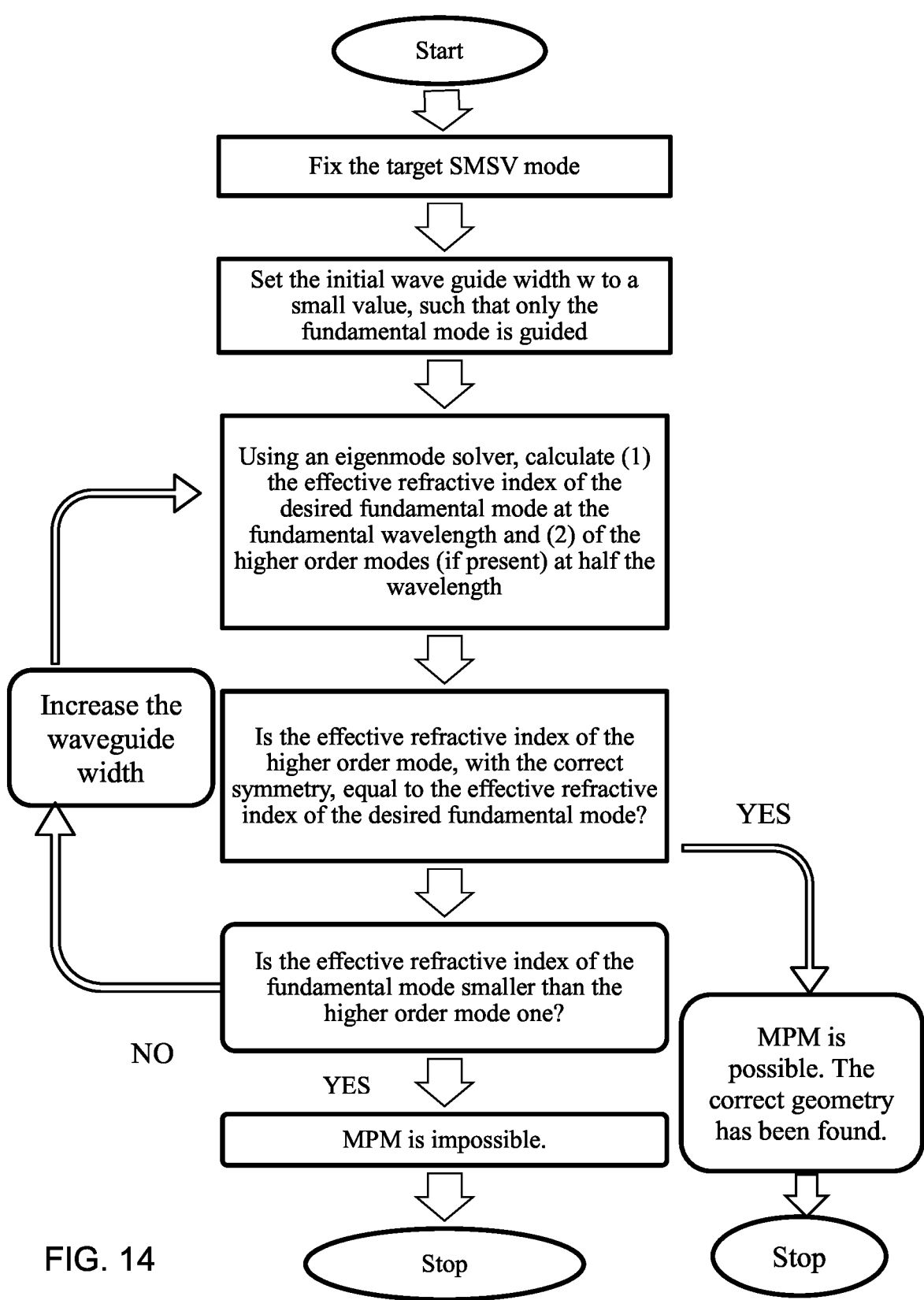
FIG. 14: A flowchart describing the method to design the geometry of the modal phase matched waveguide.

The design of the non-classical light generation stage 3 consists in finding the correct waveguide top width $w_{top}$, such that the effective refractive index of the $TE_{20}$ pump mode is the same as the effective refractive index of the $TE_{00}$ mode at 1 550 nm, if possible. The procedure to find the correct waveguide top width $w_{top}$ is described in the following ALGORITHM 2 outlined in FIG. 14:

1. Select a non-fundamental mode at 775 nm that will be used as a pump for the process. This selection is not entirely up to the designer. The designer needs to consider the material restriction—eg the crystallographic structure of LN only allows interaction between well define polarisations, as well as symmetry restrictions—the pump mode needs to share the same spatial symmetry as the fundamental SPDC mode.

2. Using a suitable eigenmode solver for the electromagnetic field, one varies the waveguide top width $w_{top}$, while monitoring the effective refractive index of the fundamental $TE_{00}$ mode at 1 550 nm and the chosen non-fundamental modes at 775 nm, to find the waveguide top width $w_{top}$ Where they coincide.

3. The waveguide length 27 is arbitrary and depends only on material availability and fabrication performance. The impact of fabrication performance on phase matched processes is discussed in detail by Matteo Santandrea et al in New J. Phys. 21 033038 (2019).

Design Specification

Figure 15:
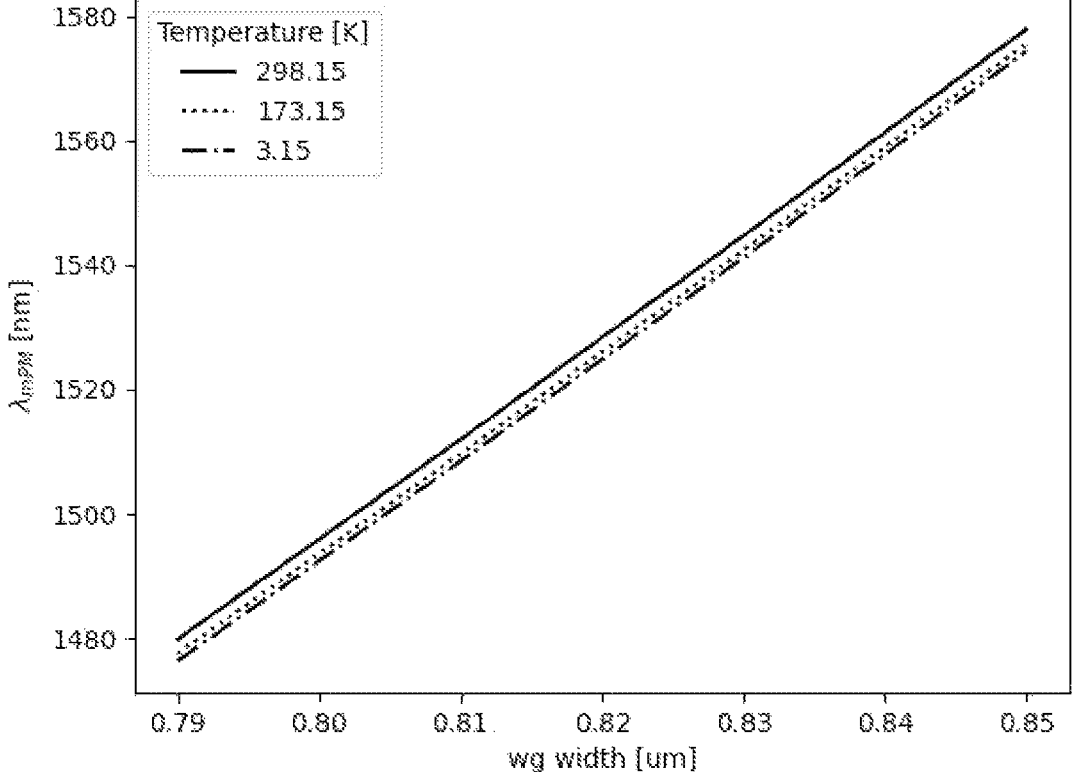
FIG. 15A graph indicating the variation of the central down converted wavelength, as a function of the waveguide width.

Following the procedure of ALGORITHM 2, we identified that it is possible to perform MPM between the fundamental $TE_{00}$ mode at 1 550 nm and the non-fundamental $TE_{20}$ mode at 775 nm in a waveguide with a top width $w_{top}$ of around 820±20 nm. By varying this width $w_{top}$, it is possible to down convert photons into the whole telecom C-band (1 530 nm to 1 570 nm), as shown in FIG. 15. Simulations show that the phase matching wavelength decreases by about 20 nm when moving to cryogenic temperatures (range 1 510 nm to 1 550 nm), as seen in FIG. 15.

The waveguide length 27 is arbitrary—the longer the waveguide 25, the higher the efficiency. The normalised conversion efficiency is about 60%/Wcm², according to the above-mentioned publication by Cheng Wang et al "Second harmonic generation in nano-structured thin-film lithium niobate waveguides," Opt. Express 25, 6963-6973 (2017), which has a comparable design.

Tunability of the MPM Process

Figure 16:
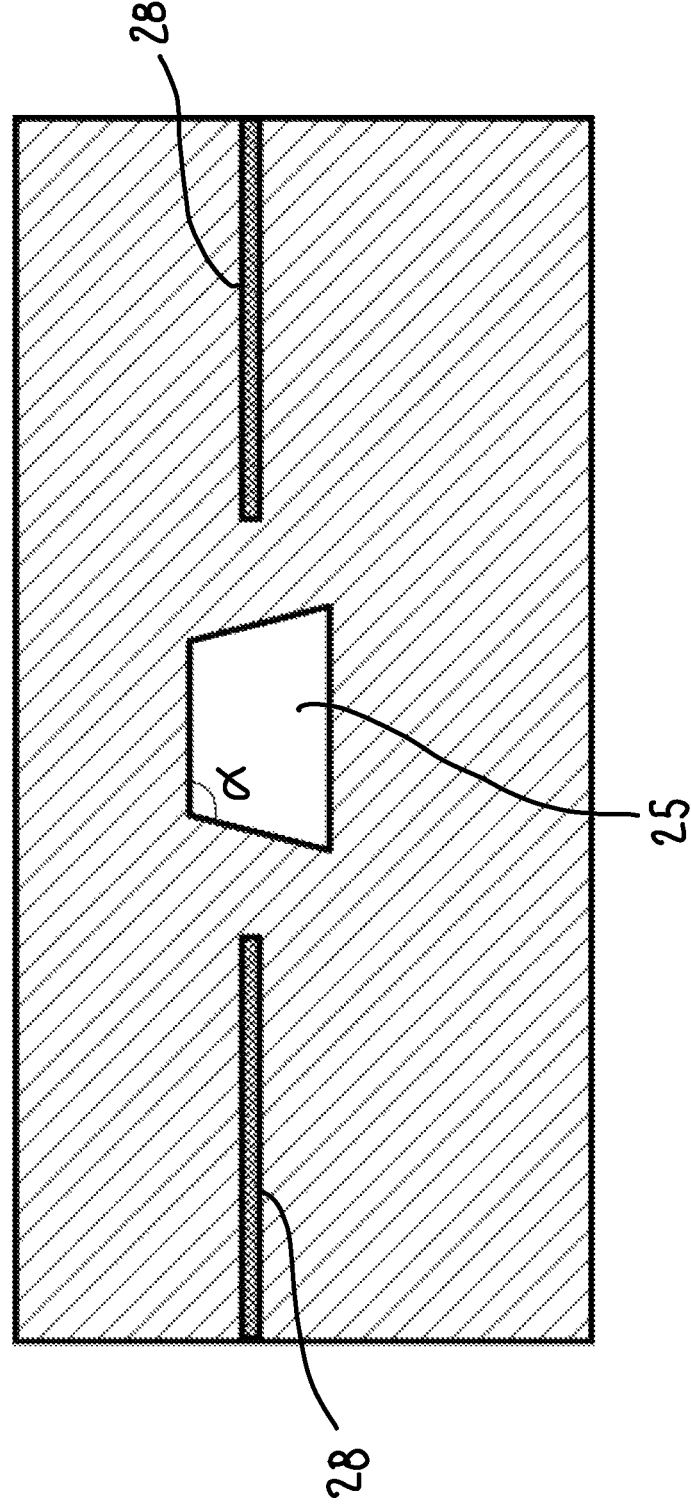
FIG. 16A cross sectional view of the straight waveguide used for squeezed light generation and two metallic electrodes used for electro-optic tuning.

The structure can be tuned by employing electrodes 28 on the side of the waveguide 25, as shown in FIG. 16.

The modulator design considered here was studied on the 400 nm-thick LNOI waveguide. Design of the modulator can be performed using the following ALGORITHM 3

1. Design the target waveguide using ALGORITHM 2.

2. Using a suitable solver, simulate the distribution of the electric field inside the waveguide 25, for a given choice of electrodes 28 metal, thickness, distance and position, relative to the waveguide.

3. For each computed electric field, calculate the overlap integral $\Gamma_{pump}$ between the electric field and the pump mode, and the overlap integral $\Gamma_{SPDC}$ between the electric field and the SPDC mode. The overlap integral between the electric field $E_{RF}$ generated by the electrodes and the electric field $E_{opt,field}$ of the optical mode is given by $$\Gamma = \frac{\int\int E_{RF}(x, y)E_{opt,field}(x, y)dx\,dy}{\int\int |E_{RF}(x, y)|^2dxdy\int\int |E_{opt,field}(x, y)|^2dxdy}.$$

4. Update the effective refractive indices seen by the modes at 775 nm and 1 550 nm, using the relation $$n' = n - \frac{n^3}{2}r_{eo}\Gamma\frac{V}{d},$$

where $r_{eo}$ is the relevant electrooptic coefficient, V is the voltage between the electrodes 28 and d is the distance between the electrodes 28. The choice of $r_{eo}$ depends on the polarisations of the optical mode and of the modulator. For the system considered here, it is the $r_{33}$ of lithium niobate, which is equal to 31 pm/V.

5. With the updated refractive indices, calculate the new wavelengths where the modified effective refractive indices of the 775 nm and the 1 550 nm modes are identical.

In our design, we found that the optimal structure consists in a modulator with gold (Au) electrodes 28 with a thickness of 100 nm. The bottom side of the electrode 28 is located 200 nm above the base of the waveguide, to align with the vertical centre of the waveguide. The distance between the two electrodes is 2 μm. With these electrode parameters, the overlap integral between the RF field and the $TE_{20}$ pump mode at 775 nm is $\Gamma_{pump}$=0.637, while the overlap integral between the RF field and the $TE_{00}$ SPDC mode at 1 550 nm is $\Gamma_{SPDC}$=0.587. With these values, the estimated phase matching shift due to the electro-optic effect is 2 to 6 pm/V, depending on the exact position of the electrodes with respect to the waveguide.

Using numerical simulations, we also calculated the effect of a temperature variation to the refractive indices of the guided modes at 1 550 nm and at 775 nm, to calculate the phase matching shift due to temperature. In the range 20 to 50° C., the phase matched wavelength changes by 20 pm/K, as shown in FIG. 15. To perform these numerical simulations, it is sufficient to use ALGORITHM 2 to calculate the phase matching point in a range of wavelength around 1 550, while providing the correct refractive index model that takes into consideration the desired operating temperature.

Design of the Separation Stage

Design Principles and Properties

Figure 17:
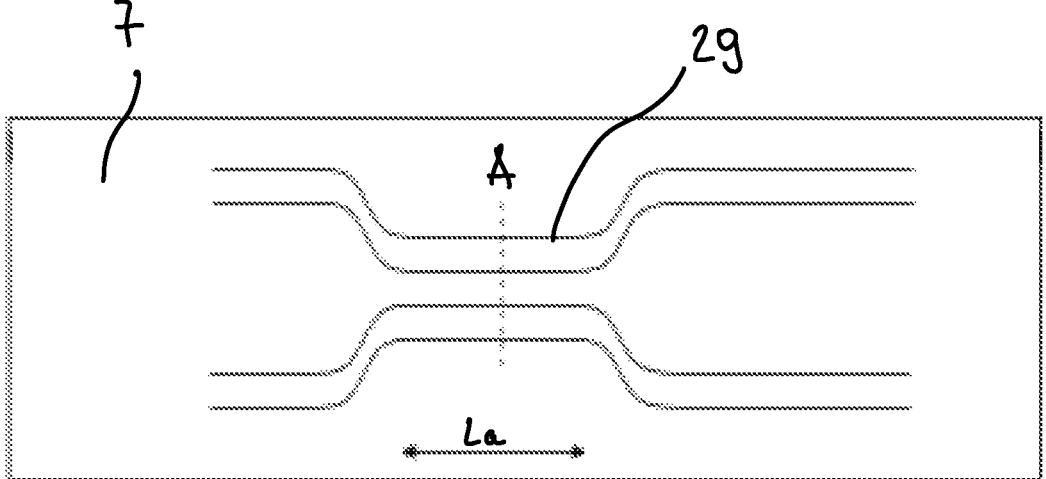
FIG. 17A scheme of the symmetric directional coupler.
Figure 17:
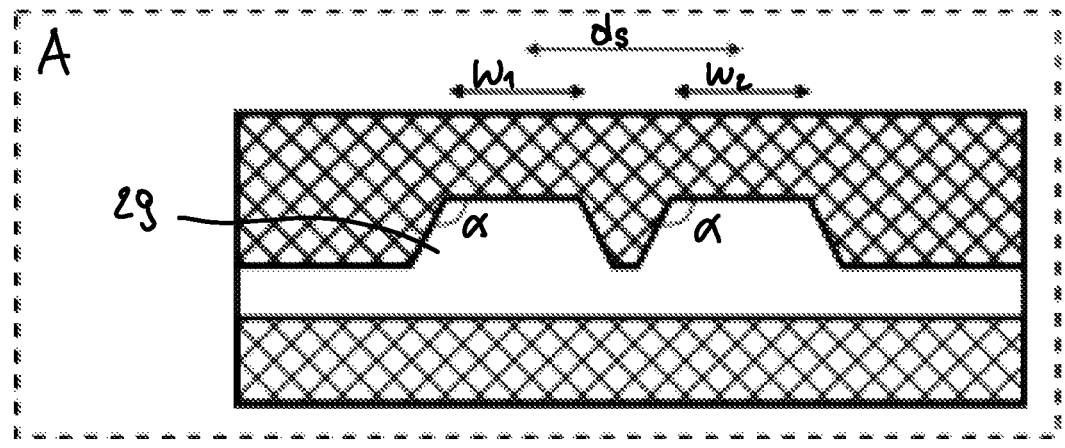

The separation stage 7 is an integrated component to remove the 775 nm pump light from the waveguide 25 where the down converted non-classical 1 550 nm light is generated. In this example, we designed a symmetrical directional coupler that separates the $TE_{00}$ SPDC mode at 1 550 nm into a new waveguide 29 as shown in FIG. 17. The directional coupler is a standard component in integrated optical circuits and can be designed according to the discussion presented by Amnon Yariv and Pochi Yeh in section 13.3 of their above-mentioned publication "Photonics: Optical Electronics in Modern Communications," Oxford Series in Electrical and Computer Engineering. Oxford University Press, Oxford.

Design Specification

The specific design for the circuitry developed in this invention consists in a system analogous to the asymmetrical directional coupler of the exemplary input adaptation stage 2 discussed above. The main difference is that the coupler is now symmetrical, meaning that the two waveguides have the same widths. Using the design principles discussed by Amnon Yariv and Pochi Yeh in section 13.3 of their before-mentioned publication, considering two waveguides with top widths $w_1=w_2=810$ nm, it is found using step 3 of ALGORITHM 1 that the optimal inter-waveguide distance is $d_s$~1.2 μm and optimal coupling length $L_s=37.9\pm1.5$ μm. These parameters allow transfer of more than 99.5% of the light (–23 dB of extinction ratio).

Alternative Designs of the Input Adaptation Stage 2

Figure 18:
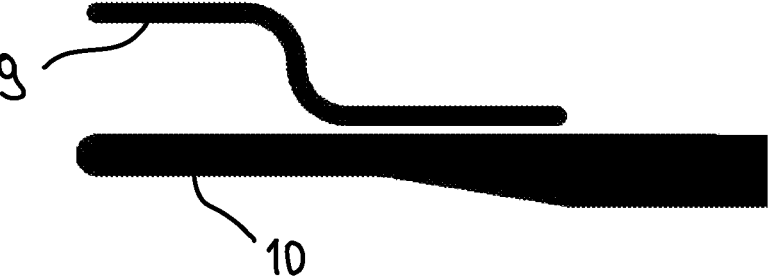
FIG. 18A sketch of a tapered asymmetric directional coupler as disclosed in Ding et al.

Variation 1—Tapered Asymmetric Directional Coupler Resilient to Fabrication Errors In this variation, the output, wider waveguide 10 is tapered to compensate for the fabrication errors present on the narrower waveguide 9, as discussed by Yunhong Ding et al in "On-chip two-mode division multiplexing using tapered directional coupler-based mode multiplexer and demultiplexer," Opt. Express 21, 10376-10382 (2013) and Z Zhang et al in their previously mentioned publication "On-chip optical mode exchange using tapered directional coupler", Sci Rep 5, 16072 (2015), the relevant parts of which publications are incorporated into the present disclosure by reference. FIG. 18, based on the above-cited publication by Ding et al, shows the sketch of the device. The wider waveguide is tapered on the side that is opposite to the coupling region, such that the coupling properties change along the coupling region. This ensures that small fabrication inaccuracies of the narrower waveguide 9 do not disrupt the coupling behaviour.

Variation 2—Tapered Mode Converter

Figure 19:
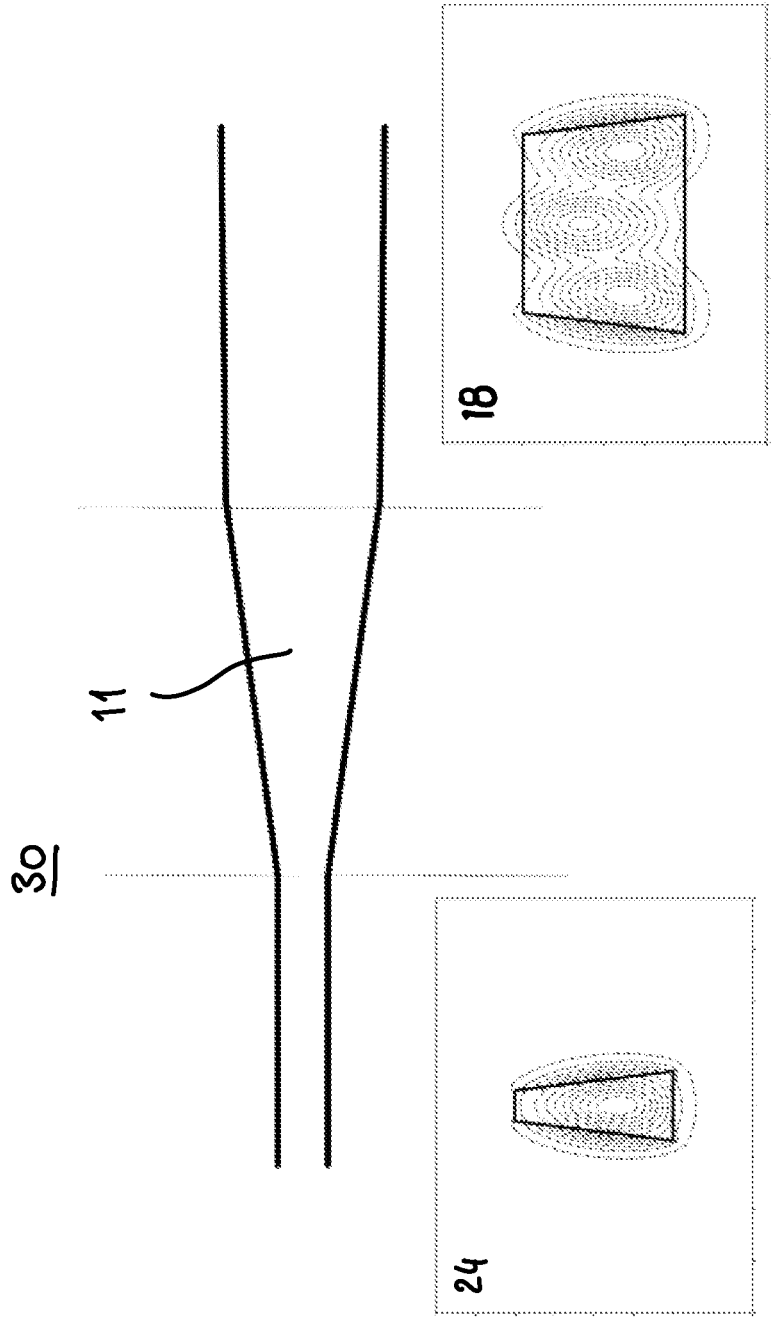
FIG. 19A sketch of a tapered asymmetric directional coupler as disclosed by Dai et al.

In this variant, mode conversion is performed using a tapered waveguide 30, as discussed by Daoxin Dai et al in their previously mentioned publication "Mode conversion in tapered submicron silicon ridge optical waveguides," Opt. Express 20, 13425-13439 (2012). The principle behind this device is that a slow transition between two waveguide widths can allow a smooth transition between two light fields with different spatial distribution. An example of this is shown in FIG. 19.

Alternative Designs of the Non-Classical Light Generation Stage 3

Figure 20A:
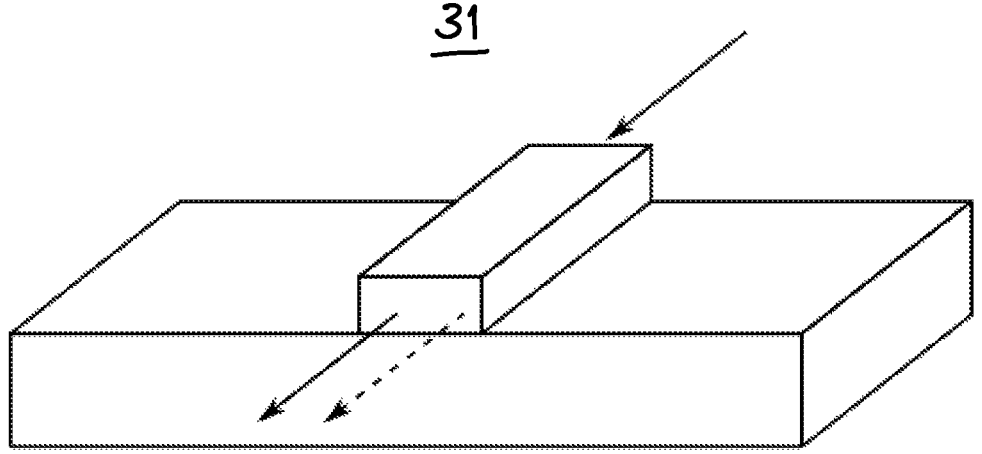
FIG. 20A A drawing of a single-pass waveguide generating squeezed vacuum light.
Figure 20B:
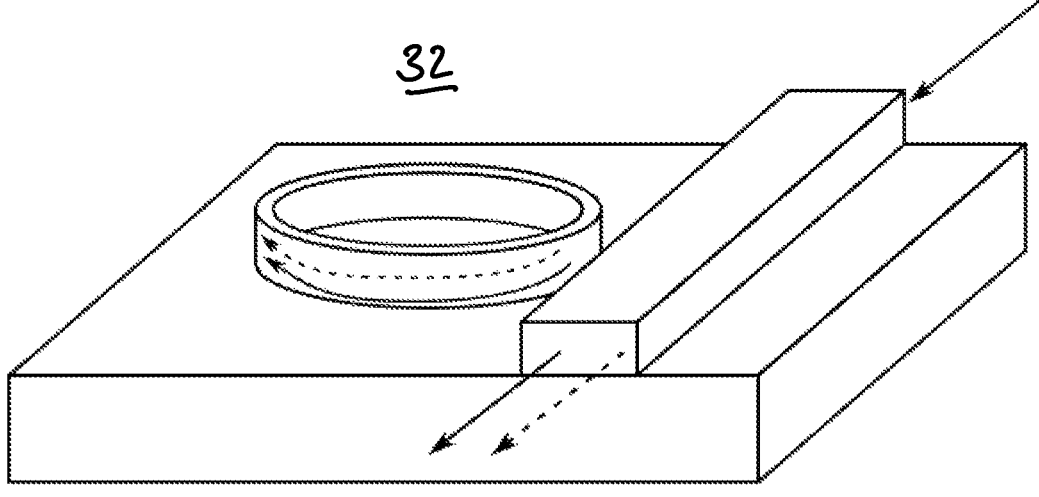
FIG. 20B A drawing of a multi-pass waveguide (or ring resonator) generating squeezed vacuum light.

Regardless of the type of material chosen, there are two different types of structures that can be used to generate squeezed light, namely single-pass waveguides 31 as shown in FIG. 20A, and multi-pass waveguides (also referred to as resonators or resonating structures) 32 as shown in FIG. 20B. In the single-pass waveguide 31, light propagates along the structure only once and then both the input (or pump) light and the generated light is extracted from the device. In the multi-pass waveguide 32, one or more fields travel multiple times across the region where the generation happens.

Figure 21A:
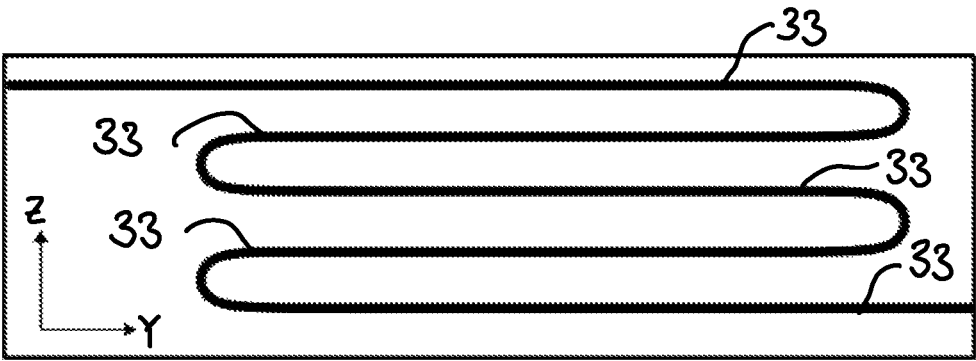
FIG. 21A A drawing of a non-classical light generation stage with multiple interconnected straight waveguides.

The non-classical light generation stage can also consist of multiple straight waveguides 33, with propagation along the crystallographic Y-axis, connected by suitable straight and/or bent junctions as shown in FIG. 21A.

The non-classical light generation stage can employ a type II process, with input photons in the TM polarisation, and output photons in the TE and TM polarisation.

Figure 21B:
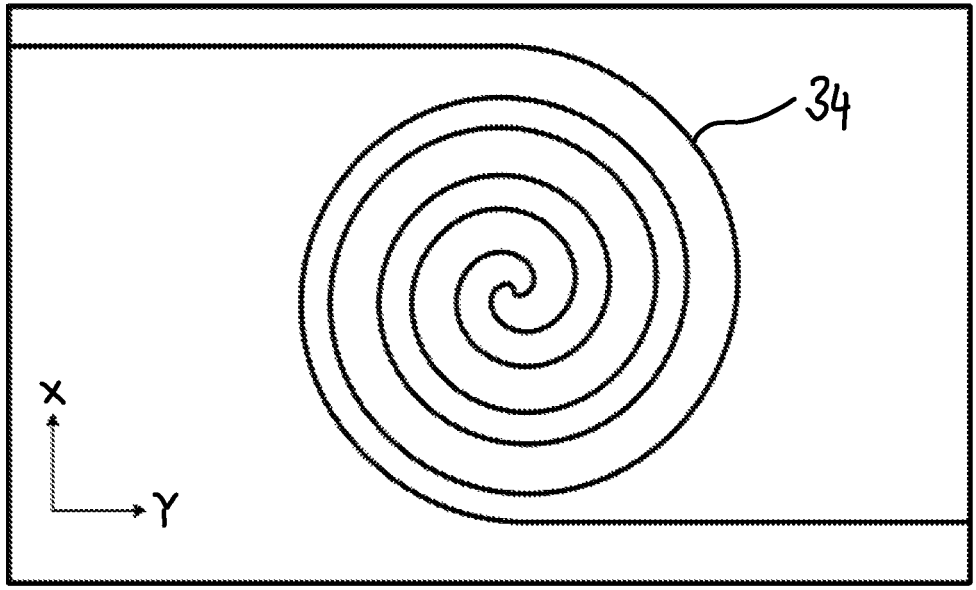
FIG. 21B A drawing of a spiral-shaped non-classical light generation stage.

For Z-cut LNOI, the non-classical light generation stage could be a spiral 34 as shown in FIG. 21B to reduce the footprint while increasing the source efficiency.

Alternative Designs for the Separation Stage 7

There are several possible filtering options for the separation stage 7. One possible way is the use of Bragg grating filters in reflection and/or transmission. In these systems, the refractive index of the 775 nm mode is modulated by means of eg doping or waveguide cross section variation. A second possible option is the usage of filtering cavities. These comprise ring resonators, integrated Fabry Perot cavities, photonic crystal cavities, or similar. A third possible option is the usage of a cascade of the components above (including directional couplers).

Figure 22:
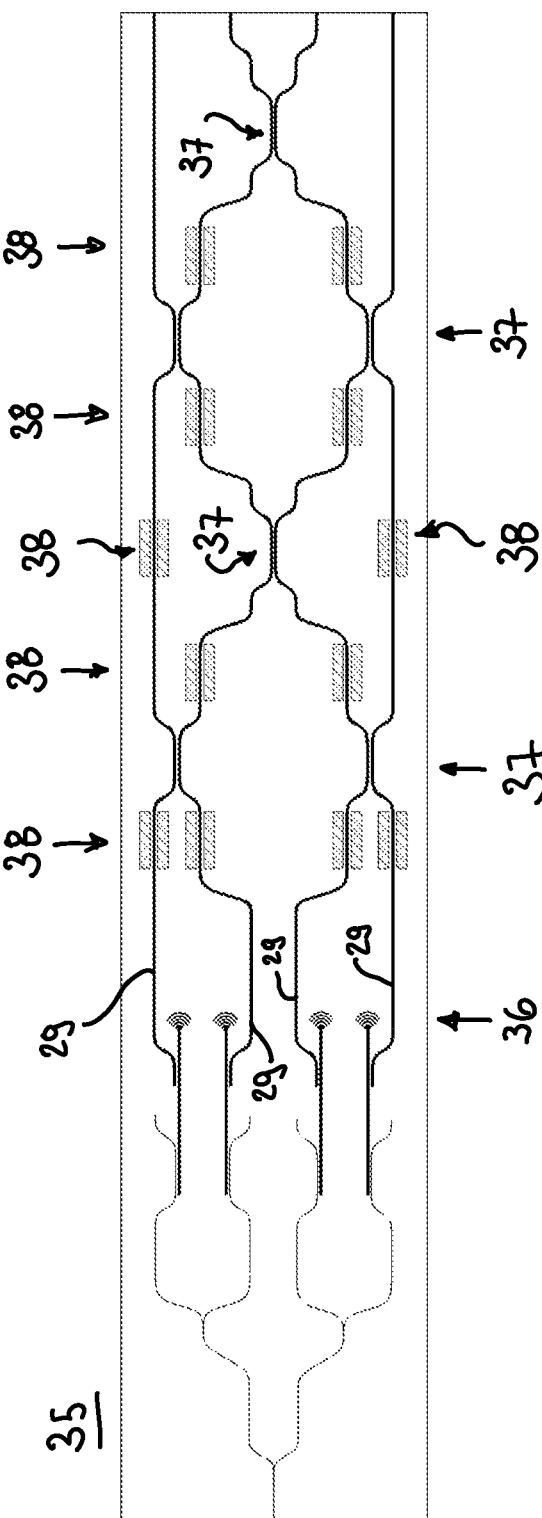
FIG. 22A drawing of an optical chip for near-term photonic quantum computing. It includes the apparatus of Example 1 and a 4×4 optical interferometer with tuneable phase shifters.

Example 2: Gaussian Boson Sampling with On-Chip Single-Mode Squeezed Vacuum Sources An example of how to use the apparatus of Example 1 is detailed in FIG. 22. The Figure shows a detailed example of a four-mode Gaussian Boson Sampling (GBS) apparatus 35 in X-cut LNOI. A GBS apparatus on n modes involves the generation of n single-mode squeezed light states, which are made to interfere on a linear optical interferometer and detected after interference on photon-number resolving detectors. Details of the GBS procedure are disclosed Craig S Hamilton et al in the section "Gaussian Boson sampling with squeezed states" on page 2, column II and page 3 Column I of their publication in Phys. Rev. Lett. 119, 170501 (2017), the relevant parts of which are incorporated into the present disclosure by reference.

By way of example, we consider a GBS device acting on n=4 modes. The first section of the chip for implementing GBS is based on a device design described in Example 1. Input pump light at 775 nm is injected via edge-coupling into a single mode waveguide, having a top width of 145 nm. This waveguide is used to route the pump light. A cascade of two Y splitters is used to split the input pump into four different waveguides. Each of these waveguides is then used as input for the four single mode squeezed vacuum sources with a design as described above in Example 1. We recall that they consist of an asymmetric directional coupler, which converts the fundamental pump mode ($TE_{00}$) into the non-fundamental ($TE_{20}$) mode, in a waveguide with 810 nm top width. This mode is the correct pump mode for the generation of single-mode squeezed vacuum (SMSV) in the straight waveguide section.

This first section is followed by a symmetric directional coupler for the separation of the generated SMSV and the leftover of the pump light. The leftover pump radiation is sent to grating couplers 36 for efficient extraction. Suitable grating couplers can be designed via a process similar to those described by I Krasnokutska et al in section II of their publication "High coupling efficiency grating couplers on lithium niobate on insulator," Opt. Express 27 (13), 17681-17685 (2019), but instead using X-cut LNOI; the relevant parts of the publication by I Krasnokutska is incorporated into the present disclosure by reference. The generated SMSV is then used as input of the four-mode optical interferometer. The four-mode optical interferometer consists of a cascade of 6 beam splitters 37 and twelve electro optical phase shifters 38, arranged as in FIG. 22.

Each beam splitter 37 in turn consists of a symmetric directional coupler. The waveguides with 810 nm top width are coupled at a distance d=1.2 μm and for an optimal coupling length of L=17.5±1.0 μm. The phase shifters consist of electro optical phase shifters, which can be fabricated as described in the previously-mentioned publication by Zihan Li et al "Tightly confining lithium niobate photonic integrated circuits and lasers," arXiv: 2208.05556 (2022), in the section "Fabrication process with DLC hard mask" on pages 3 and 4. Such an interferometer, consisting of tuneable beam splitters 37 and phase shifters 38 can be used to realise an arbitrary linear optics transformation, which allows performing arbitrary GBS computations. Photon-number resolving detection is performed on the output light. The detection could be performed either using superconducting nanowire single-photon detectors or using transition edge sensors. These detectors can be integrated on the waveguides in the photonic chip itself or be present off-chip.

The input of the GBS computation is the settings of the chip that describe the squeezing amounts and the settings of the interferometer including the beam splitter 37 and phase shifter 38 settings. The output of the GBS computation is the set of photon numbers measured on the different detectors.

The present invention enables the realisation of a GBS apparatus on a single photonic chip made of non-doped LNOI. Such a chip could include the sources, switches and potentially also the detectors on one platform, thus offering unmatched scalability and ease of fabrication.

Figure 23:
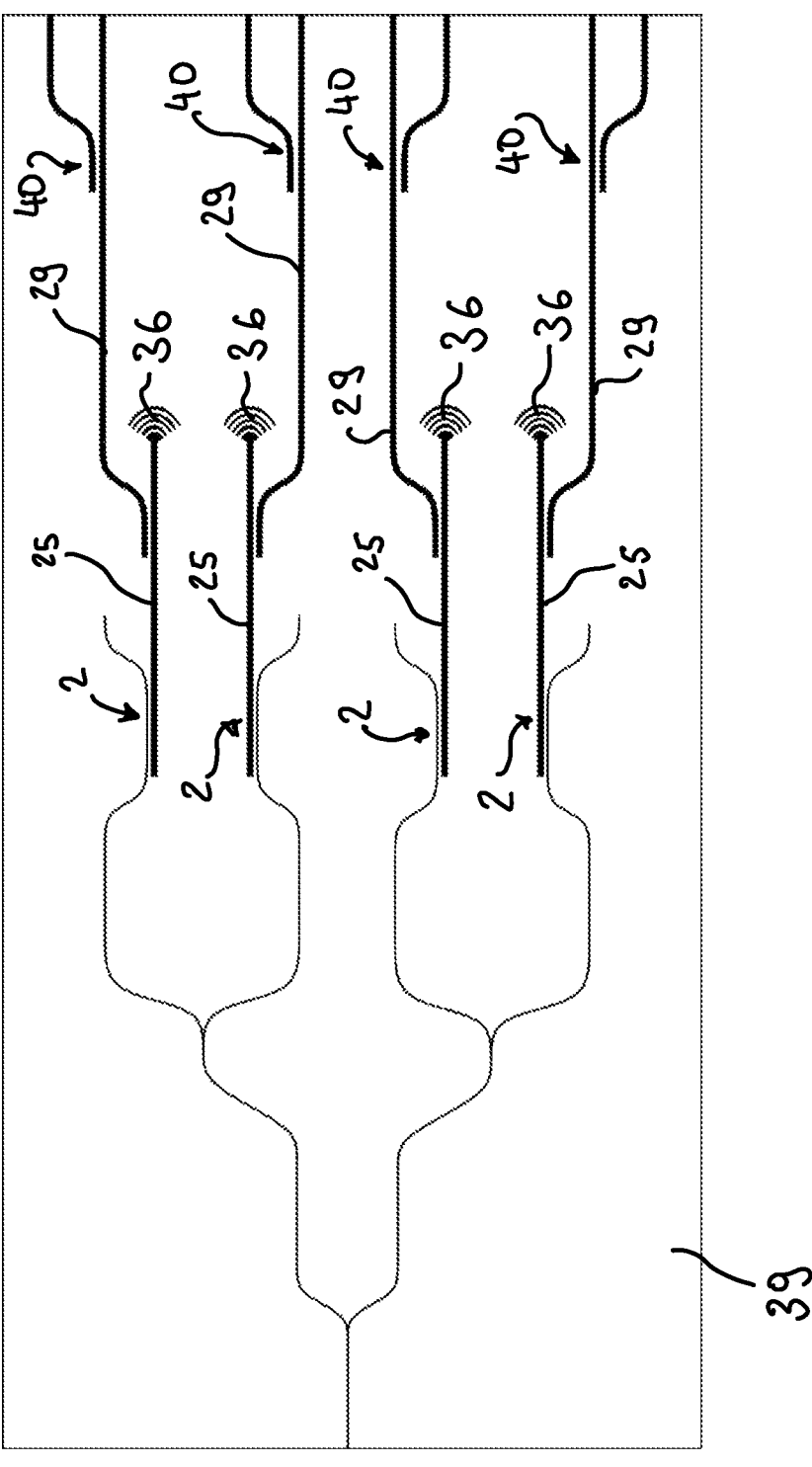
FIG. 23A drawing of an optical chip for the generation of multiplexed heralded single photon states.
Figure 24:
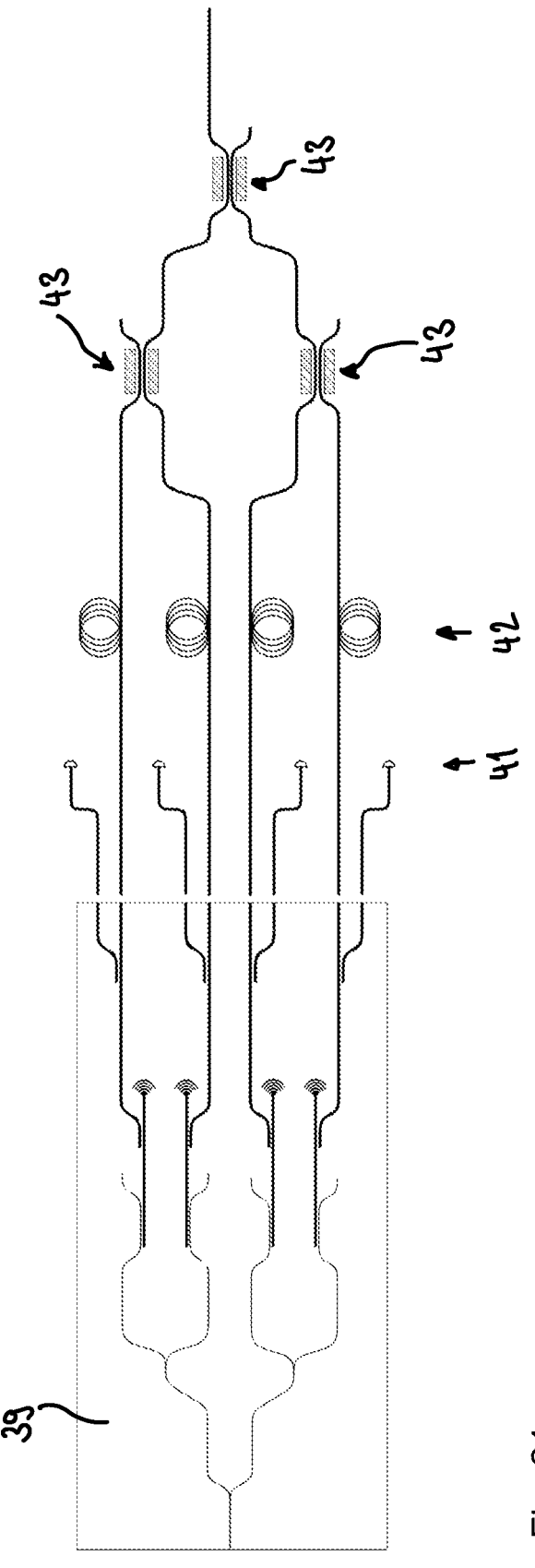
FIG. 24 A drawing of a circuit employing the optical chip in FIG. 23 for the generation of multiplexed deterministic single photon states; the outputs of the optical chips are edge coupled to eight optical fibres; four of these fibres are routed to off-chip single photon detectors. The remaining four fibres are routed to delay lines and then to a network of switches, whose state is controlled by the output of the single photon.

Example 3: Deterministic Heralded Single Photon Source for Universal Photonic Quantum Computing An example of the usage of the apparatus of Example 1 as a source of heralded single photons is shown in FIGS. 23 and 24. In FIG. 23, the details of an optical chip 39 containing the sources are shown.

The first section of the chip is based on an apparatus of Example 1. Input pump light at 775. nm is injected via edge-coupling into a single mode waveguide, having a top width of 145 nm. This waveguide is used to route the pump light. A cascade of two Y splitters is used to split the input pump into four different waveguides. Each of these waveguides is then used as input for the four single mode squeezed vacuum sources of Example 1. They consist of an asymmetric directional coupler 2, which converts the fundamental pump mode ($TE_{00}$) into the non-fundamental ($TE_{20}$) mode, in a waveguide with 810 nm top width. This mode is the correct pump mode for the generation of SMSV in the straight waveguide section 25. This section is followed by a symmetric directional coupler 7 for the separation of the generated SMSV and the leftover of the pump light. For efficient extraction, the leftover pump radiation is sent to grating couplers 36 as described by I Krasnokutska et al in section II of their above-mentioned publication "High coupling efficiency grating couplers on lithium niobate on insulator," Opt. Express 27 (13), pages 17681-17685 (2019). The generated SMSV needs to be manipulated, in order to separate the two photons that, probabilistically, populate the state. This can be performed using a frequency-selective beam splitter 40, in order to separate the photons according to their wavelength. Photons with a wavelength shorter than 1 550 nm are coupled out of the waveguide, into a different output. These photons will be routed to single photon detectors 41, as shown in FIG. 24, in order to provide the heralding signals, which allows one to infer the presence of the sibling photon.

The frequency-dependent beam splitters 40 can be designed using the technique presented by E S Magden et al in "Transmissive silicon photonic dichroic filters with spectrally selective waveguides," Nat Commun 9, 3009 (2018).

After separation, the photons that have a wavelength smaller than 1 550 nm are coupled off-chip to external single photon detectors 41 that detect the number of photons impinging on them. Only the detection events constituted by one single photon are considered successful detection events. These successful detection events herald the presence of the sibling photon, ie, a photon with wavelength greater than 1 550 nm.

The photons with wavelength greater than 1 550 nm are guided to a delay network 42, which could be either on chip or off-chip in optical fibre. Such a network needs to impart a delay sufficient to wait for the successful detection of the single photons and the analysis of the detection event. Therefore, these delays will need to provide delays of between approximately 100 ns and 1 μs. The delayed signals are then injected into a network consisting of electro optic switches 43, as seen in FIG. 24. These switches are controlled according to the detection events measured by the external single photon detectors 41. The switches 43 are used to redirect the heralded single photons to the output of the network.

Deterministic heralded single photons are a crucial resource for universal photonic quantum computing. While a single SMSV source along with a single-photon detector functions as a non-deterministic single-photon source, many such non-deterministic sources as described above can function as a deterministic or near-deterministic single-photon source. The present invention opens the possibility of fabricating several such SMSV generators and fast optical switches on a single chip, thus enhancing the prospects of fabricating deterministic single-photon sources for universal photonic quantum computing.

The invention claimed is:

1. A method for generating non-classical light from classical light, the method comprising the steps of:
   providing a non-classical light generation stage comprising at least one waveguide,
   providing an input adaptation stage with a waveguide that continues as the waveguide of the non-classical light generation stage,
   converting in the input adaptation stage classical light into classical light of a different waveguide propagation mode,
   inputting the classical light of a different waveguide propagation mode into the non-classical light generation stage, and
   converting in the non-classical light generation stage at least part of the classical light into non-classical light,
   wherein the classical light is in a non-fundamental propagation mode of the waveguide of the non-classical light generation stage and the non-classical light is in a fundamental propagation mode of the waveguide of the non-classical light generation stage.

2. The method of claim 1, wherein in the non-classical light generation waveguide, the classical light is of a first wavelength and the non-classical light is of a second wavelength different from the first wavelength.

3. The method of claim 1, wherein the non-classical light generation waveguide's effective refractive index for the classical light injected into the non-classical light generation waveguide is identical to the non-classical light generation waveguide's effective refractive index for the non-classical light.

4. The method of claim 1, wherein a waveguide of the non-classical light generation stage has a thickness of between 300 and 500 nm.

5. An apparatus for generating non-classical light from classical light, the apparatus comprising a non-classical light generation stage for converting classical light at least partly into non-classical light, wherein the apparatus comprises an input adaptation stage for converting classical light into classical light of a different waveguide propagation mode, the input adaptation stage being arranged upstream of the non-classical light generation stage such that the converted light obtained in the input adaptation stage can be input into the non-classical light generation stage for converting it at least partly into non-classical light, wherein a waveguide of the input adaptation stage continues as a waveguide of the non-classical light generation stage.

\* \* \* \* \*